US005881287A

United States Patent [19]

Mast

[11] Patent Number: 5,881,287

[45] Date of Patent: Mar. 9, 1999

[54] METHOD AND APPARATUS FOR COPY PROTECTION OF IMAGES IN A COMPUTER SYSTEM

[76] Inventor: Michael B. Mast, 5158 Clareton Dr., Aqoura Hills, Calif. 91301

[21] Appl. No.: 824,139

[22] Filed: Mar. 25, 1997

Related U.S. Application Data

[63] Continuation of Ser. No. 289,529, Aug. 12, 1994, abandoned.

[51] Int. Cl.[6] .............................. G06F 12/14; H04L 9/00

[52] U.S. Cl. .............................. 395/701; 395/712; 380/4; 380/5; 380/3; 380/25; 711/100

[58] Field of Search .............................. 395/701, 712, 395/705, 653; 380/3–5, 9, 25, 23; 711/164, 100; 345/133, 326

[56] References Cited

U.S. PATENT DOCUMENTS

| | | | |
|---|---|---|---|
| 3,827,029 | 7/1974 | Schlotterer et al. | 711/163 |
| 4,525,599 | 6/1985 | Curran et al. | 380/4 |
| 4,558,176 | 12/1985 | Arnold et al. | 380/4 |
| 4,573,119 | 2/1986 | Westheimer et al. | 380/4 |
| 4,862,156 | 8/1989 | Westberg et al. | 345/133 |
| 4,930,073 | 5/1990 | Cina, Jr. | 395/726 |
| 4,947,318 | 8/1990 | Mineo | 395/186 |

OTHER PUBLICATIONS

Farrow, R. “Unix System Security”, 1991, pp. 26–28.

“Microsoft Windows Software Development Kit”, Programmer’s Reference, vol. 2: Functions, 1991, pp. 535–539, 625,626, 894–899, 956–958.

“Programming Windows 3.1”, by Charles Petzold, 1992, pp. 175–193, 907–929.

*Primary Examiner*—Tariq R. Hafiz

*Assistant Examiner*—Tuan Q. Dam

*Attorney, Agent, or Firm*—Hecker & Harriman

[57] ABSTRACT

A method and apparatus for securing images from unlicensed appropriation on a computer system. Prior art graphics security measures, such as encryption, cease to protect the images once the images are deciphered and loaded into the video adapter memory. In the present invention, unlicensed transfers of image data from the video adapter to other storage means are substantially prevented by intercepting data transfer requests to the operating system and identifying whether the image is one to be protected. If the image is one that is marked for protection, the region of the data transfer incorporating the protected image is blacked out or replaced with a specified pattern or message. A preferred embodiment provides a library of software routines that are utilized by image display applications. These routines interface with the computer memory and the video display memory to block the copying of designated images by means of “hooks” into the operating system or operating environment. By means of these hooks and routines, the present invention identifies all regions on the video device that contain a protected image and exclude these regions from any operation that transfers data from the video display memory. Any attempts to transfer the designated regions result in an image containing “blacked out” regions in their place. The preferred embodiment includes an encryption scheme for image security prior to display.

58 Claims, 7 Drawing Sheets

METHOD AND APPARATUS FOR COPY PROTECTION OF IMAGES IN A COMPUTER SYSTEM

This is a continuation of application Ser. No. 08/289,529 filed on Aug. 12, 1994, now abandoned.

BACKGROUND OF THE INVENTION

1. Field of the Invention

The present invention relates to the field of computer image display, and in particular, to image protection.

2. Background Art

In the growing multimedia industry, a critical concern to image creators and image applications developers is image misappropriation, or piracy. Several pre-existing methods for protecting images from piracy have been developed, including watermarks, encryption and proprietary formats.

Watermarks are intentional imperfections in an image before or after it is converted to digital form. The resultant lack of quality in the image mitigates the desire to copy the image. However, watermarking is not satisfactory for imaging and multimedia products as it does not provide the high image quality required for marketable applications.

A more common method of image protection is encryption. Image encryption typically involves taking image data that exists in a standard format, such as GIF or BMP, and converting it into an unrecognizable data file through the use of a mathematical encryption algorithm. Prior to display, the encrypted image is passed through a deciphering process to regenerate the image data in a displayable format. The decrypted data is then placed in the video adapter's memory for use by the display unit.

Without encryption, image files in standard formats are recognized by a broad range of image processing applications. For this reason, unencrypted images can be copied and manipulated through unsanctioned applications. By encrypting computer files, use of the computer files can be restricted to only those applications provided with the deciphering scheme. Image files are therefore substantially protected from misappropriation up until the moment they are deciphered and placed in the video adapter's memory, where a video adapter is any device connected to the computer's data bus, including any local bus, that has its own memory or uses the computer's main memory to render images on a video display device. Once the image is present in the video memory in a standard display format, the image is again susceptible to piracy. Therefore, encryption is a necessary but incomplete protection scheme.

Proprietary formats are image data formats created for use in applications unique to the developer. These formats differ from an encryption scheme in that there often exists a one to one mapping between the source image file and the stored image file. Therefore, an expert may be able to recognize the nature of the data (i.e. that it is image data). In some cases, it is possible to reverse engineer the proprietary format and obtain the images. Further, some proprietary formats are available as part of developer tool kits. The format can be incorporated into a new application that is able to read or transfer proprietary image files.

Regardless of what encryption schemes or proprietary formats are used, an image file must eventually be translated into a standard image file format when it is supplied to the memory for the display unit. Once displayed, the image data sheds all security features. An end user can pirate the image by copying it from the video adapter's memory and storing it in any format. The pirated image data can then be distributed to other destinations.

For example, in the Windows™ operating environment sold by Microsoft Corporation, a user may pirate an image by pressing a "PRINT SCREEN" button on a computer keyboard and storing a bit-mapped image of the screen in a "clipboard." From the clipboard, the image can be "pasted" into an image processing application and stored for eventual unlicensed distribution. Therefore, though current encryption methods and proprietary formats are useful for securing image files, they are insufficient for protecting image files once they are provided to a video adapter's memory.

U.S. Pat. No. 4,241,415 to Masaki et al. discloses an apparatus for selectively masking portions of visual output. The apparatus contains a first memory for storing information code signals convertible into visible information and a second memory containing specific code signals in locations corresponding to the code signals in the first memory which selectively are not to be visualized. Signals from each memory are read simultaneously. When the device is in mask mode and a specific code signal is detected in the second memory, the corresponding information code signal in the first memory is masked, either by omission or replacement with a special mark. The Masaki patent does not suggest use of this apparatus in any security scheme.

U.S. Pat. No. 4,352,100 to O'Connell discloses an image formatting apparatus for use in changing image contrast or providing masked borders around selected images. The apparatus is not designed for security purposes. Further, it does not act to blank the selected image, but to blank the areas around it.

U.S. Pat. No. 4,554,584 to Elam et al. discloses an auxiliary circuit for remote control of television receiver blanking by digital code words transmitted as part of the video signal. The circuit allows the end user to determine what video signals to blank from the display unit.

U.S. Pat. No. 4,881,179 to Vincent discloses a method of controlling the unauthorized disclosure of classified data in a calendar application. Only those having a clearance code equivalent to or higher than the specified clearance code for the information can receive the calendar information. No apparatus is disclosed for preventing the copying of calendar images already present on the screen.

U.S. Pat. No. 4,932,053 to Fruhauf et al. discloses a safety device for preventing unauthorized detection of protected data in a memory chip by the use of current sensing approaches. Random current generators within the chip produce random current values on output pins of the chip to conceal actual current values that may indicate memory data values.

U.S. Pat. No. 5,036,537 to Jeffers et al. discloses a method for blocking out video signals in a television receiver. No means are disclosed to prevent copying of images that are allowed to reach the receiver.

U.S. Pat. No. 5,142,576 to Nadan discloses a key security system for selectively providing restricted information to video displays. An encoder transmits display update data and a key to a plurality of decoders. The decoder that matches the key receives the update data and places it in the picture store for a video display. No means are suggested for preventing the copying of images stored in the picture store of the video display.

U.S. Pat. No. 5,144,664 to Esserman et al. discloses a secure communication network serving a plurality of terminals grouped into different security categories. A headend device has several encryption algorithms stored. In addition, each terminal is coupled to a security element providing a decryption algorithm associated with one of the encryption algorithms stored in the headend. When security is breached, the headend switches to a new encryption algorithm and the security elements are replaced with new elements having a new decryption algorithm corresponding to the new encryption algorithm used in the headend. The object is to achieve inexpensive security system replacement in the event of a breach. The subject of copying images is not disclosed.

U.S. Pat. No. 5,208,857 to Lebrat discloses a method for scrambling and unscrambling image data by using the discrete cosine transform on blocks of data and by mixing these data blocks. The scrambled images must be unscrambled before being displayed in a video display unit.

U.S. Pat. No. 5,313,227 to Aoki et al. discloses a graphic display system capable of cutting out a partial image. The system includes image storage means, outline drawing means, mask data generator means, and partial image write means for writing into the image storage means only a portion of the source image which is not masked by the mask data. No means are described to prevent the copying of these stored images.

SUMMARY OF THE PRESENT INVENTION

The present invention provides a method and apparatus for securing images from unlicensed appropriation on a computer system. Prior art graphics security measures, such as encryption, cease to protect the images once the images are deciphered and loaded into the video adapter memory. In the present invention, unlicensed transfers of image data from the video adapter to other storage means are substantially prevented by intercepting data transfer requests and identifying whether the image data therein is to be protected. If the image data is marked for protection, the region of the data transfer incorporating the protected image is blacked out or replaced with a specified pattern or message.

A preferred embodiment provides a library of software routines that are utilized by image display applications. These routines interface with the computer memory and the video display memory to block the copying of designated images by means of "hooks" into the operating system or operating environment. By means of these hooks and routines, the present invention identifies all regions on the video device that contain a protected image and exclude these regions from any operation that transfers data from the video display memory. Any attempts to transfer the designated regions result in an image containing "blacked out" regions in their place.

An encryption scheme is associated with the preferred embodiment of the present invention. A virtual device driver and decryption server are described which perform the decryption of the image data. The encryption/decryption scheme provides security for the image data up until the data is decrypted and placed in the video memory, at which time the present invention provides security for the decrypted data in the video memory.

DETAILED DESCRIPTION OF THE PRESENT INVENTION

A method and apparatus for copy protection of displayed images in a computer system are described. In the following description, numerous specific details, such as operating system environments and encryption processes, are described in order to provide a more thorough description of the present invention. It will be apparent, however, to one skilled in the art, that the present invention may be practiced without these specific details. In other instances, well-known features have not been described in detail in order to not obscure the present invention unnecessarily.

Figure 1:
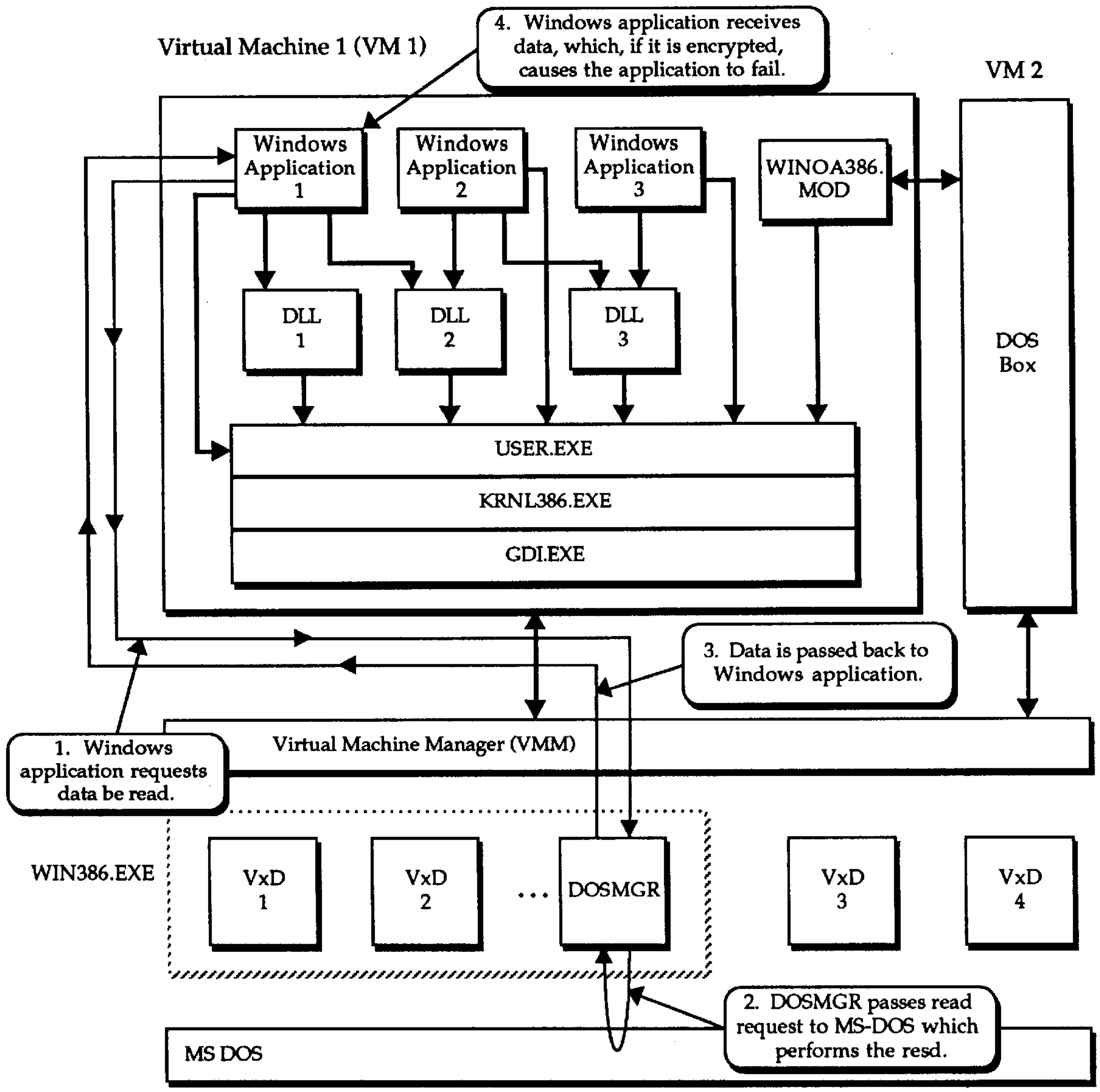
FIG. 1 is a block diagram of a read request processed in a sample Microsoft Windows™ environment.

FIG. 1 illustrates how a read request is processed in the prior art in a Microsoft Windows™ 3.1 environment (hereafter referred to as "Windows") in enhanced mode. The system is comprised of Virtual Machines VM1 and VM2, Virtual Machine Manager VMM, Windows executable program WIN386.EXE, and the operating system MS-DOS. Virtual Device Drivers VxD3 and VxD4 represent other drivers present but nonintegral to the Windows system. This system is shown for purposes of example only, and presents only one possible environment.

Virtual Machine VM1 contains Windows Applications 1–3 and associated Dynamic Link Libraries (DLLs) 1–3. A fourth application, WINOA386.MOD, does not call any DLLs. Other components of Virtual Machine VM1 are the core Windows modules: USER.EXE, KRNL386.EXE and GDI.EXE. These core modules make calls to the standard drivers, e.g. display adapter, printer and scanner drivers. The GDI.EXE program or Graphics Device Interface, contains many functions for displaying graphic output. WIN386.EXE contains many virtual device drivers (VxDs), including the DOSMGR device driver which interfaces with the Virtual Machine Manager and the MS-DOS operating system. Virtual device drivers are device specific, converting general commands into the precise actions required to implement the command on a specific device. MS-DOS does not handle application address space above one megabyte inherently. Therefore, DOSMGR assigns Windows applications address space below one megabyte and copies data from this lower address space to the upper address space in a manner that is transparent to the application. Other VxDs within WIN386.EXE are responsible for such items relative to Windows as a timer, math coprocessor, interrupt controller, etc.

In FIG. 1, Windows Application 1 is able to make calls to DLL1 and DLL2. Windows Application 2 is able to make calls into DLL2 and DLL3. Windows Application 3 can make calls only into DLL3. The first two applications make calls into two DLLs while at the same time sharing one of the DLLs. The third application makes calls only into one DLL, which is also shared by the second application. In addition, all Windows-based applications and DLLs make calls into USER.EXE, KRNL386.EXE, and GDI.EXE. When not in full screen mode, WINOA386.MOD provides Virtual Machine VM2, also commonly referred to as a "DOS box," with a captioned window from which various settings affecting the virtual machine may be set.

In enhanced mode, a major component of Windows is the Virtual Machine Manager. Two of the Virtual Machine Manager's more important roles are to provide the virtual machines necessary for running Windows and supporting any of Windows' virtual DOS sessions, and to coordinate the virtual device drivers which resolve resource contention issues among the various virtual machines.

FIG. 1 illustrates how a typical request to read data is handled. Windows Application 1 makes a request (step 1) of the operating system to read data from a file. It is assumed that the file exists and has been opened for reading. The DOSMGR device driver intercepts the request and passes the request (step 2) along to the MS-DOS operating system which performs the read, reading the data into an area which MS-DOS can address. DOSMGR then copies the read data into the Windows Application's data area and signals to Windows Application 1 that the read is complete (step 3). Windows Application 1 then continues processing (step 4).

If the read data was encrypted by an encryption program, the Windows application will not be able to correctly interpret the read data, which is still encrypted. The Windows application will either recognize that it cannot understand the data and produce an appropriate error message for the user to respond to, or it will fail. In either case, the user is not granted access to the image file.

The preferred embodiment of the present invention is described as applied to the Windows 3.1 environment as outlined in FIG. 1. The present invention can be similarly applied in other system environments for image protection. In the preferred embodiment, an encryption scheme is described for protection of images up to the point when the images are loaded into a graphics application. The present invention can be used with other encryption schemes as well.

The encryption scheme in the preferred embodiment begins with an operating system-based pre-installer and an encryption key. The developer of multi-media products (hereafter referred to as "the Developer") has one encryption key per product line. The pre-installer (PREINSTL.EXE) of the preferred embodiment reads the encryption key and the actual executable multi-media application that the Developer will be distributing. The pre-installer modifies two programs, ENCRYPT.EXE and UINSTALL.EXE, and one library, UINSTALL.DLL. The encryption key and the application's "signature" are recorded in ENCRYPT.EXE, UINSTALL.EXE and UINSTALL.DLL. The "signature" is a collection of information about a specific application. It is used to determine the authenticity of the program requesting access to the encrypted files.

Figure 2:
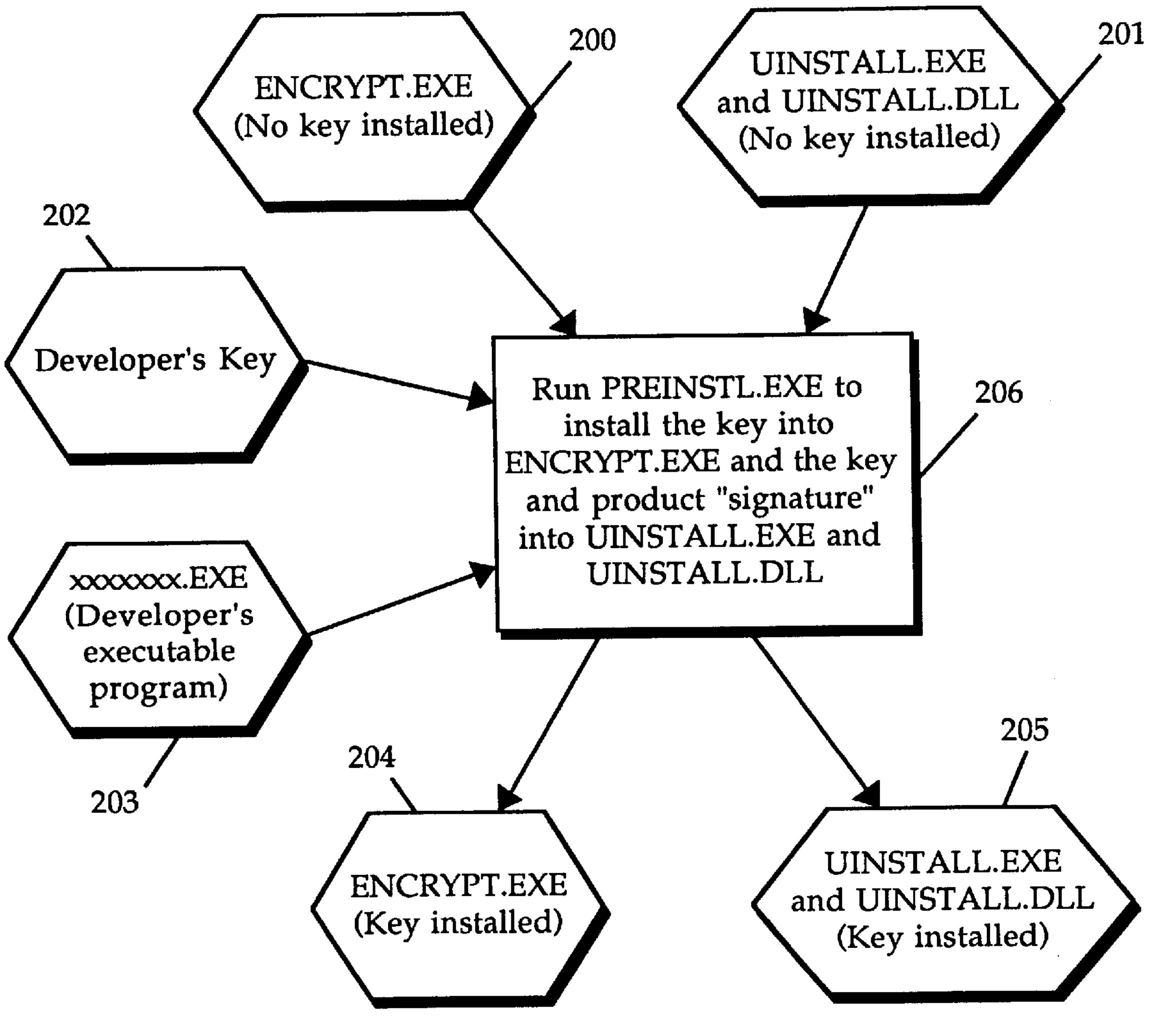
FIG. 2 is a block diagram of a pre-installation procedure for a preferred embodiment of the present invention.

FIG. 2 illustrates the pre-instaflation process. Block 200 is the encryption program without the encryption key installed. Block 201 represents the End User installation components, UINSTALL.EXE and UINSTALL.DLL, with no encryption key installed. Block 202 represents the Developer's assigned encryption key for the appropriate product line. Block 203 represents the Developer's executable application program, xxxxxxx.EXE. Block 204 represents the encryption program with the encryption key installed. Block 205 represents the End User installation components with encryption key and application signature installed. Block 206 represents the execution block of PREINSTL.EXE.

As outlined above, The elements of blocks 202 and 203 are read by the pre-installation program, PREINSTL.EXE, in block 206, and used to modify the programs and library contained in blocks 200 and 201. The output blocks 204 and 205 contain programs and a library personalized to the encryption key and signature of the individual product line.

The pre-installation procedure comprises several steps. First, PREINSTL.EXE creates a string of random data whose length is equal to or greater than the length of the Developer's encryption key and program "signature." According to predetermined criteria, some or all of this random data is then exclusive or'ed with the encryption key and "signature" producing an encrypted encryption key and "signature." The encrypted encryption key and "signature" are written to UINSTALL.EXE and UINSTALL.DLL along with the random data. The fact that random data, some of which may not participate in the exclusive or'ing of the encryption key and "signature," is added to UINSTALL.EXE and UINSTALL.DLL makes it almost impossible to determine where and how the encryption key and "signature" are stored in UINSTALL.EXE and UINSTALL.DLL.

UINSTALL.EXE is a Windows-based installer with an operating system-based version as its stub. UINSTALL.DLL is a Windows-based dynamic link library. The Developer uses only one of these files, the appropriate file depending on the procedure used to install the Developer's application on the End User's computer.

UINSTALL.EXE can be run as a Windows-based program or at the operating system level. When run as a Windows-based program, UINSTALL.EXE does not require a main window or dialog box of any kind. UINSTALL.EXE can therefore run without requiring the End User to be aware of it. If the Developer prefers, a Windows-based installer capable of making calls into a DLL can make calls into UINSTALL.DLL and thus perform the install operations.

Figure 3:
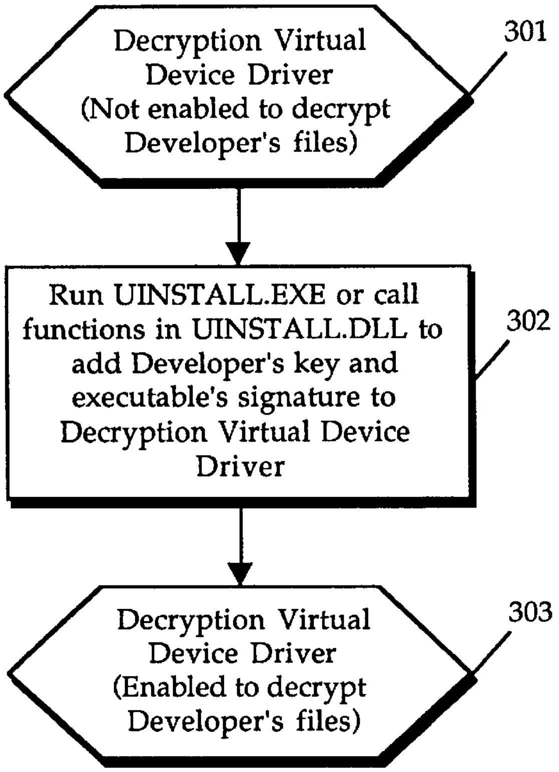
FIG. 3 is a block diagram of an installation procedure for enabling the Decryption Virtual Device Driver of the preferred embodiment of the present invention in the End User's system.

Whichever option is chosen, UINSTALL.EXE or UINSTALL.DLL (already modified by PREINSTL.EXE) modifies a copy of a Decryption Virtual Device Driver installed on the End User's computer. As shown in FIG. 3, the Decryption VxD (block 301) is read by either UINSTALL.EXE or UINSTALL.DLL (block 302) and modified to include the encryption key and the application signature. The "installed" Decryption VxD (block 303) contains the Developer's encryption key and application signature in an internal "table" of encryption keys. This procedure allows the End User to have a variety of products which use the security system of the preferred embodiment installed on the End User's computer while only requiring one copy of the Decryption VxD. In such a situation, the Decryption VxD's internal table would hold multiple encryption keys.

The Decryption VxD in the preferred embodiment is a Windows-based virtual device driver. The Developer distributes the Decryption VxD along with the Developer's application. The parameters or script that are used by the Developer's installer are modified to include the Decryption VxD and an image protection DLL (BITBLOCK.DLL, see below), and also to run UINSTALL.EXE or make calls into UINSTALL.DLL. The Decryption VxD provides the Developer's application with the ability to read the encrypted files which the Developer has sold to the End User. The Decryption VxD provides the decryption functionality without requiring modifications to the Developer's source code, or additions or replacements in any object code. Therefore, the Developer's application can read encrypted files even if third party object code or DLLs are used to access image files stored on disk.

Similar to the pre-installation procedure, the UINSTALL process also creates a string of random data whose length is equal to or greater than the length of the total amount of data (including the encrypted encryption key, the program "signature" and the random data) written to UINSTALL.EXE and UINSTALL.DLL by the pre-installation process. According to predetermined criteria, some or all of this random data is then exclusive or'ed with the data that was written to UINSTALL.EXE and UINSTALL.DLL. The result of this exclusive or'ing of data along with the random data is written to the Decryption VxD. The fact that random data, some of which may not have participated in the exclusive or'ing of the data written to UINSTALL.EXE and UINSTALL.DLL, is added to the Decryption VxD makes it almost impossible to determine where and how the encryption key and "signature" has been stored in the Decryption VxD.

ENCRYPT.EXE is an operating system-based encrypter. This program is used by the Developer to encrypt the image files prior to their distribution to the End User. Once encrypted, the End User must have the Developer's product installed on their computer system in order to read the encrypted files which the End User has purchased. The Developer uses ENCRYPT.EXE to encrypt image files of any format (e.g. BMP, GIF, JPG, etc.). For example, IMAGE.BMP which the Developer has encrypted cannot be read by just any application capable of reading BMP files. This is true even if the other application also uses the same encryption method because a different key and signature will be associated with the other application.

Figure 4:
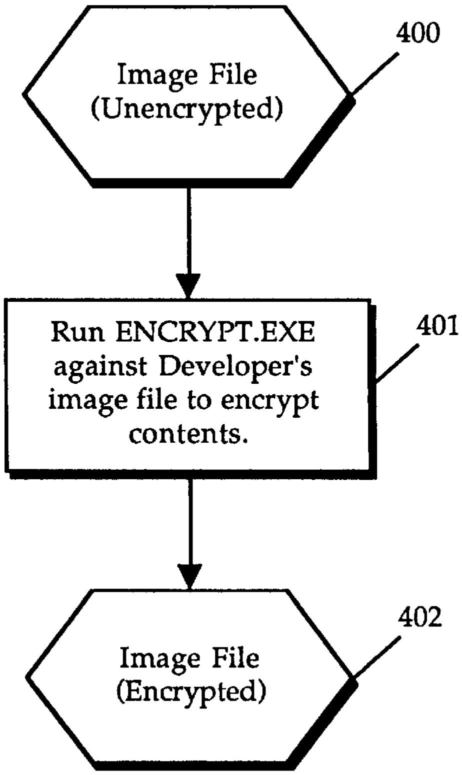
FIG. 4 is a block diagram of an encryption procedure utilized in the preferred embodiment of the present invention.

FIG. 4 illustrates the encryption process. The unencrypted image file (block 400) is processed by the ENCRYPT.EXE program in block 401. The encryption program generates the encrypted image file (block 402) as an output file. The encrypted image file is then distributed to the End User for use with only the appropriate application.

Figure 7:
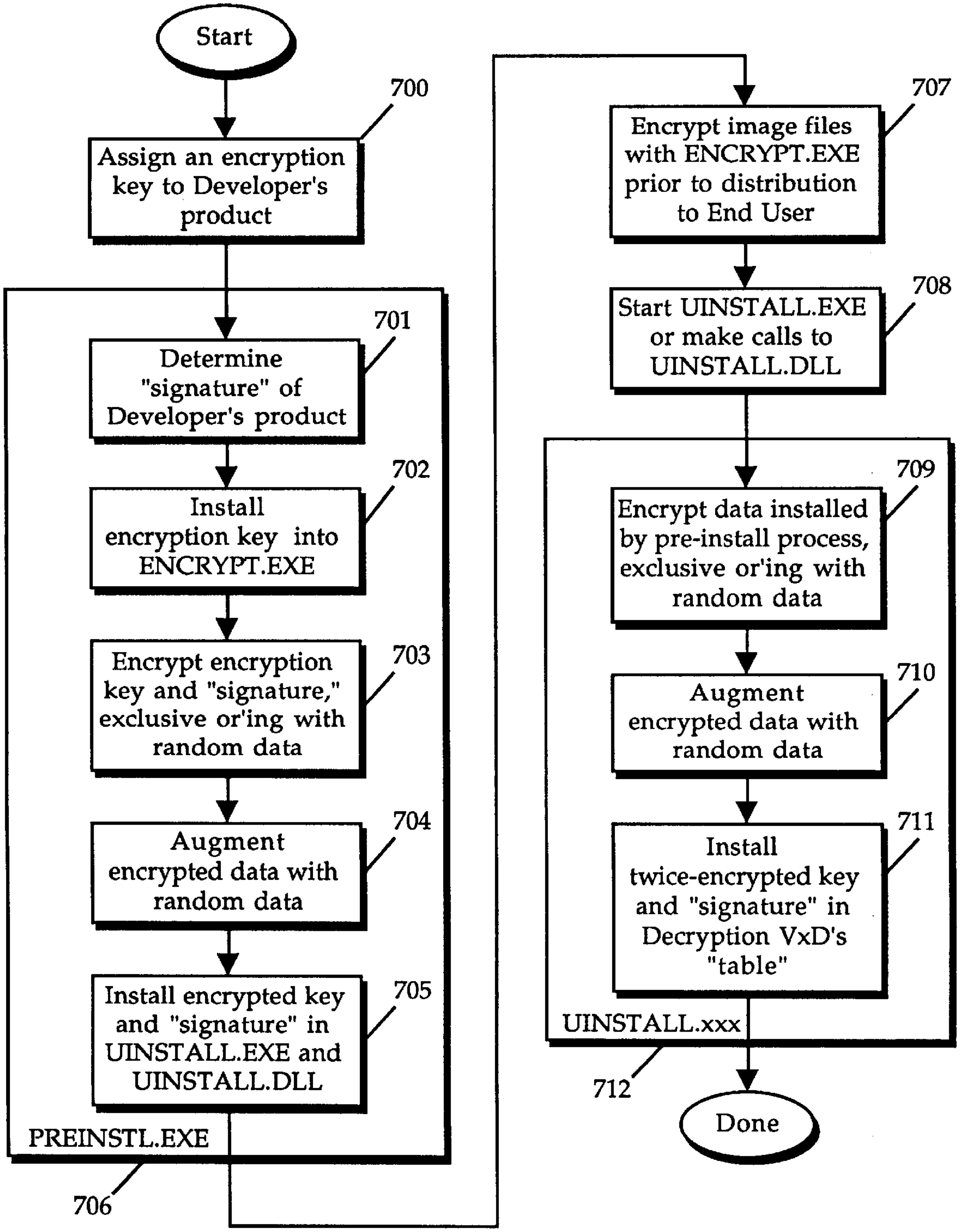
FIG. 7 is a flow diagram of the encryption installation procedure of the preferred embodiment of the present invention.

FIG. 7 is a flow chart of the encryption installation steps of the preferred embodiment. Encryption is not necessary for the present invention to function. However, securing the image files with some form of encryption scheme protects the files from misappropriation prior to display. Encryption schemes other than the one described herein are usable as well.

In FIG. 7, the encryption installation procedure begins by assigning an encryption key to the Developer's product. The installation begins with the PREINSTL.EXE block 706 which comprises blocks 701–705. In block 701, the "signature" of the product is determined. In block 702, the encryption key is installed in the encryption program ENCRYPT.EXE. In blocks 703 and 704, the encryption key and product signature are first exclusive or'ed with random data and then, in block 705, the exclusive or'ed data and the random data, some of which was used in the exclusive or'ing operation, are installed in the user install elements, UINSTALL.EXE and UINSTALL.DLL.

After PREINSTL.EXE is completed, ENCRYPT.EXE can be used to encrypt image files for distribution to the End User as stated in block 707. In block 708, the End User begins installation of the product on his or her system, running UINSTALL.EXE or making calls to UINSTALL.DLL. Block 712 represents the UINSTALL.xxx operation, comprising blocks 709–711. In blocks 709 and 710, the data containing the encrypted encryption key, signature and random data is again exclusive or'ed with more random data and augmented with the random data, some or all of which was used in the exclusive or'ing process. In block 711, the twice-encrypted key and signature are installed in the Decryption Virtual Device Driver's "table."

Figure 5:
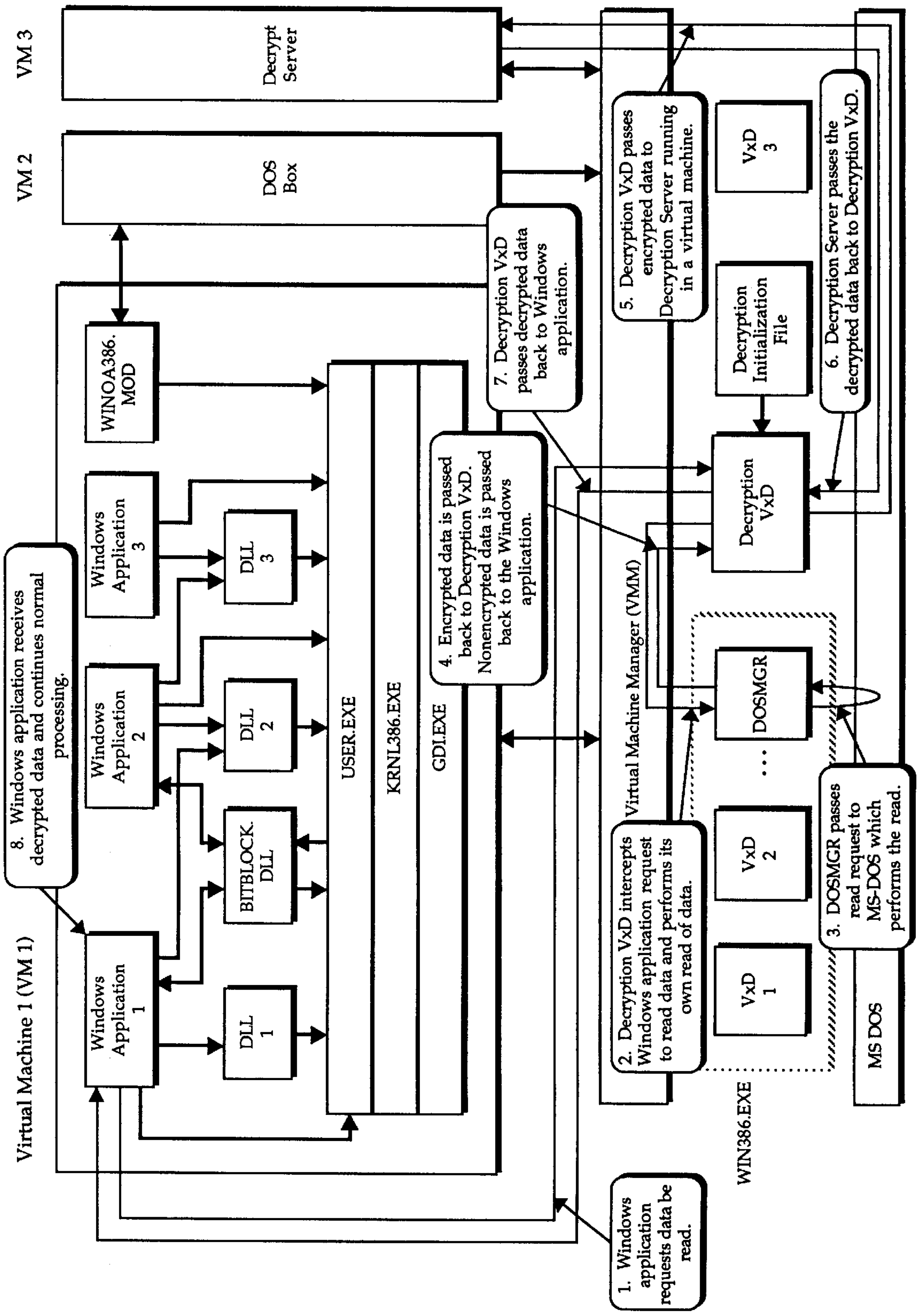
FIG. 5 is a block diagram of a read request processed in a sample Microsoft Windows™ environment incorporating the preferred embodiment of the image protection scheme of the present invention.

FIG. 5 illustrates how a read request is performed in the system of the preferred embodiment. Unlike the system of FIG. 1, in FIG. 5, the Decryption VxD is introduced between the Virtual Machine Manager (VMM) and the operating system (MS-DOS). Also, a Decrypt Server VM3 runs in parallel with the other virtual machines. The increased image protection method of the present invention is provided by the BITBLOCK.DLL dynamic link library into which Windows Applications 1 and 2 make calls. BITBLOCK.DLL is also able to make calls into the enabled applications.

BITBLOCK.DLL performs it's functions by means of "hooks" into Windows (or other operating environment in a non-Windows embodiment). "Hooks" are resources that install filter functions. These filter functions process "hooked" function calls before the functions that were hooked are called. The three Windows modules (USER.EXE, KRNL386.EXE and GDI.EXE) make calls into the BITBLOCK.DLL by means of these hooks. As BITBLOCK.DLL is a Windows library, the Developer makes minor source code modifications to an enabled application and link edits the application along with BITBLOCK.DLL. BITBLOCK.DLL prevents the Developer's protected images from being copied to any destination (e.g. global memory, the Windows clipboard, etc.) by any application other than the Developer's product, including Windows itself.

Virtual Machine VM3 is the virtual machine in which the Decryption Server runs. This virtual machine is not a "DOS box" in the usual sense. While the Decryption Server is a DOS-based program, the virtual machine in which it runs is not associated with a WINOA386.MOD window. Hence, it is not visible to the End User. It also does not appear in the Task Manager's list of applications (TASKMAN.EXE, part of Windows).

A request by Windows Application 1 to read data proceeds as follows. The application makes a request (step 1) to the operating system to read a file (assuming the file is present and has been opened for reading). The Decryption VxD intercepts the request (step 2) by virtue of "hooks" in the Virtual Machine Manager and decides if it is the type of file in which it is interested. The Decryption VxD does this by tracking the opening of files and matching the file types, as determined by its extension (e.g. xxxx.GIF, xxxx.BMP or xxxx.HLP, etc.), against a list of file extensions which it obtains from the BITBLOCK.INI initialization file. If the extension is one that the Decryption VxD is not interested in, such as a .HLP file, the VxD allows the request to proceed. If the file is a file of interest, such as a .BMP "bitmap" file, the VxD checks to see if the file is encrypted in the ENCRYPT.EXE format by examining the first several bytes of the file for the expected encryption signature (encrypted files maintain the same extension as unencrypted files). If the file being read is not encrypted, or at least not encrypted in the expected format, the Decryption VxD passes the request on to the DOSMGR (step 3) and the request proceeds normally, as described with respect to FIG. 1.

If the file being read is encrypted, as determined by the first block of data written to the file, the Decryption VxD determines if the application is enabled to read the encrypted data. The VxD does this by comparing the Window Application 1's "signature" to that which is stored in the VxD's internal tables. If the application has not been enabled to read the encrypted data, the VxD issues an appropriate error message to the user and passes the request on to DOSMGR. An unenabled application will be unable to process the encrypted data.

If Windows Application 1 is enabled to read encrypted data, the VxD determines the key necessary to decrypt the data. The VxD then issues its own request to read the data (steps 2–4). The read data is then passed on to the Decryption Server (step 5). The Decryption Server takes the data and key supplied by the Decryption VxD and decrypts the data. Once decrypted, the Decryption Server notifies the Decryption VxD that it has completed decrypting the data (step 6) and the VxD copies the decrypted data into the Window Application's data area and signals the application that the read request has completed (step 7). The Windows Application then finds decrypted data in its read area and continues processing as though the data had never been encrypted (step 8).

These steps prevent all but enabled Windows Applications whose keys and "signatures" have been installed in the Decryption VxD from reading unencrypted data from files that have been encrypted using the application's key. Once the Windows Application has displayed the unencrypted image files on the screen, the BITBLOCK.DLL library becomes active in impeding the displayed data from being copied from the screen to some other area from which it may be written to a file in an unencrypted form.

Each enabled Windows Application registers with the BITBLOCK.DLL, specifying a callback procedure located within the application that is to be called by the DLL. The BITBLOCK.DLL dynamic link library maintains a list of these callback procedures. By means of hooks placed in the GDI.EXE program, specifically to the "BitBlt" function, BITBLOCK.DLL is able to monitor when requests are made for a transfer of data from the video memory. When BITBLOCK.DLL detects that an application (or one of the application's DLLs) is attempting to copy anything from the screen to any destination, BITBLOCK.DLL processes through the list of callback functions. If the list is empty, i.e. there are no callback functions, BITBLOCK.DLL permits the copy attempt to succeed, resulting in image data being copied from the screen (video adapter memory). If there are callback functions identified in the list, BITBLOCK.DLL calls each of the callback functions.

Each callback function returns to BITBLOCK.DLL either an object which identifies which region of the screen is to be protected or zero, indicating that there are no more regions requiring protection. A region represents the outline or border defining a portion of device memory. For example, a destination region represents the outline or border defining a portion of memory to which data is to be written. As each callback function returns a region of the device memory to be protected to BITBLOCK.DLL, BITBLOCK.DLL adds the region to a single region that represents all of the combined regions that have been returned. A copy of the original destination region is then saved. The combined region is then removed from the original destination region and the copy attempt is allowed to resume. Thus, all areas except the removed (protected) regions are copied from the video adapter memory. Those areas in the destination region that correspond to the source region from which no source data was copied are then filled with any pattern or distorted in some way to indicate that those regions correspond to protected images. In the preferred embodiment, solid black is used as the fill pattern. The destination region is then replaced with the saved original destination region. The preferred embodiment describes how the destination region is modified to prevent the protected data from being effectively transferred. An alternate embodiment may modify the source region in a similar manner to prevent the transfer of the protected data.

Figure 6:
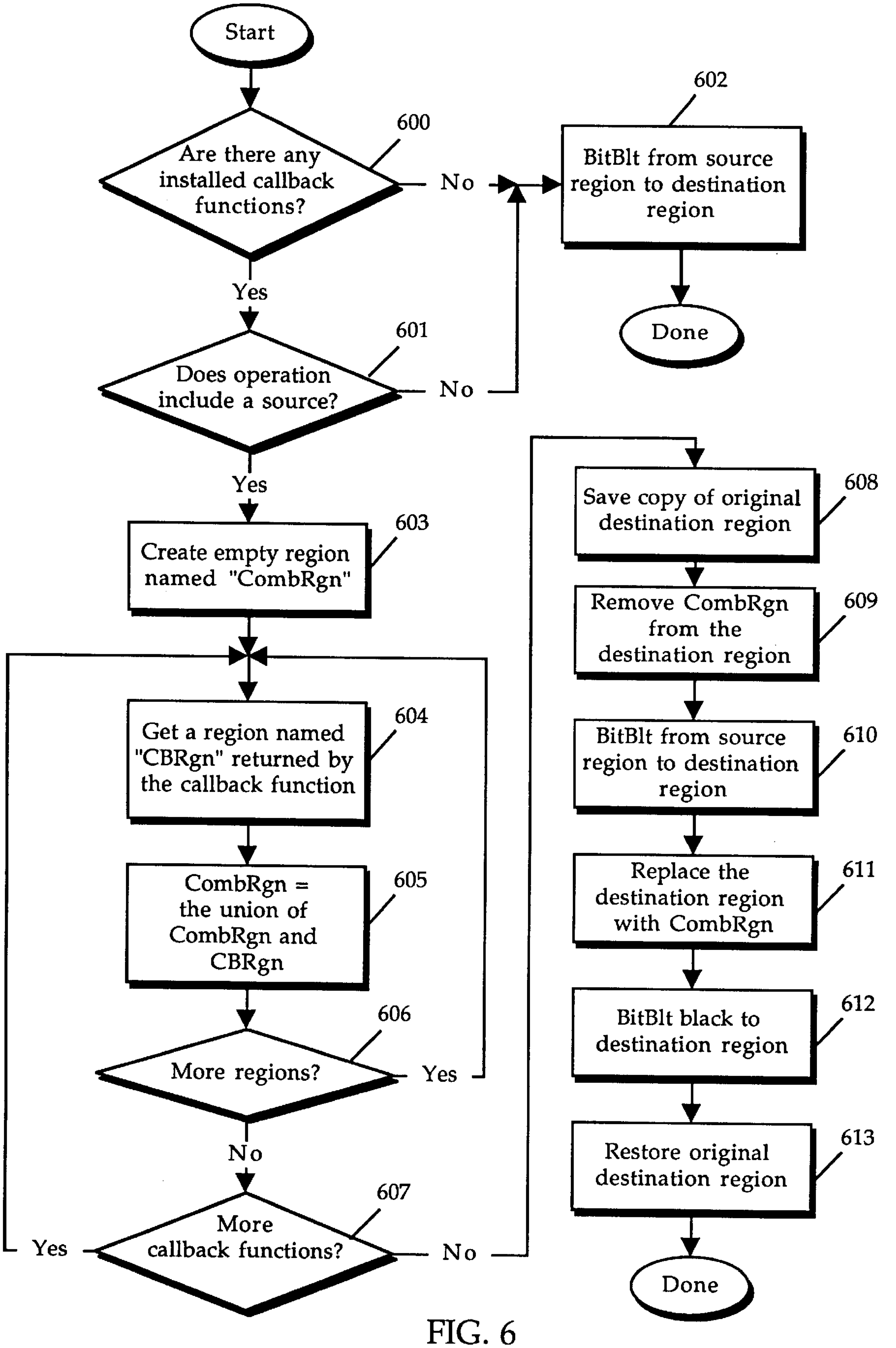
FIG. 6 is a flow diagram of the image blocking operation of the preferred embodiment of the present invention.

FIG. 6 is a flow diagram of a video memory transfer in the preferred embodiment. The flow begins when BITBLOCK.DLL detects a "BitBlt" function call via hooks to the Windows operating environment. "BitBlt" is a Windows function that copies a bitmap from the source device to the destination device. "hdcSrc" and "hdcDest" parameters specify the source and destination devices, respectively.

When BITBLOCK.DLL detects a BitBlt call, a check is made in block 600 to see if there are any callback functions installed, i.e. if any applications have registered any protected images. If there are no installed callback functions, the BitBlt function is allowed to continue (block 602). If there are installed callback functions, in block 601, BITBLOCK.DLL looks to see if a source device is designated. If no source is designated, the BitBlt function is allowed to continue (block 602).

If a source is designated in the BitBlt call, in block 603, an empty region is created and labeled "CombRgn." Next, in block 604, the first protected image region is received from the first callback function and assigned the label "CBRgn." In block 605, the union of CombRgn and CBRgn is assigned to CombRgn. In block 606, a check is made to see if there are more regions to get from this callback function. If there are more regions, the process returns to block 604, continuing to cycle through blocks 604–606 until there are no more regions specified by that callback function. The process then continues to block 607 wherein a check is made to determine if more callback functions are registered. If more callback functions are registered, the process returns to block 604 to continue with the next registered callback function. Thus, a region of protected images is pieced together as CombRgn.

When the list of callback functions is completed, in block 608, a copy of the original destination region is saved. In block 609, the region of protected images defined by CombRgn is subtracted from the specified destination region of the BitBlt call. In the following block, block 610, the BitBlt function is permitted to transfer the contents of the source device memory into the modified destination region within the destination device memory. Then in block 611, the destination region is reassigned with CombRgn, and in block 612, a fill pattern is BitBlt'ed to the destination region specified by the combined regions of the protected images. In block 612, the destination region is replaced with the saved original destination region.

Figure 8:
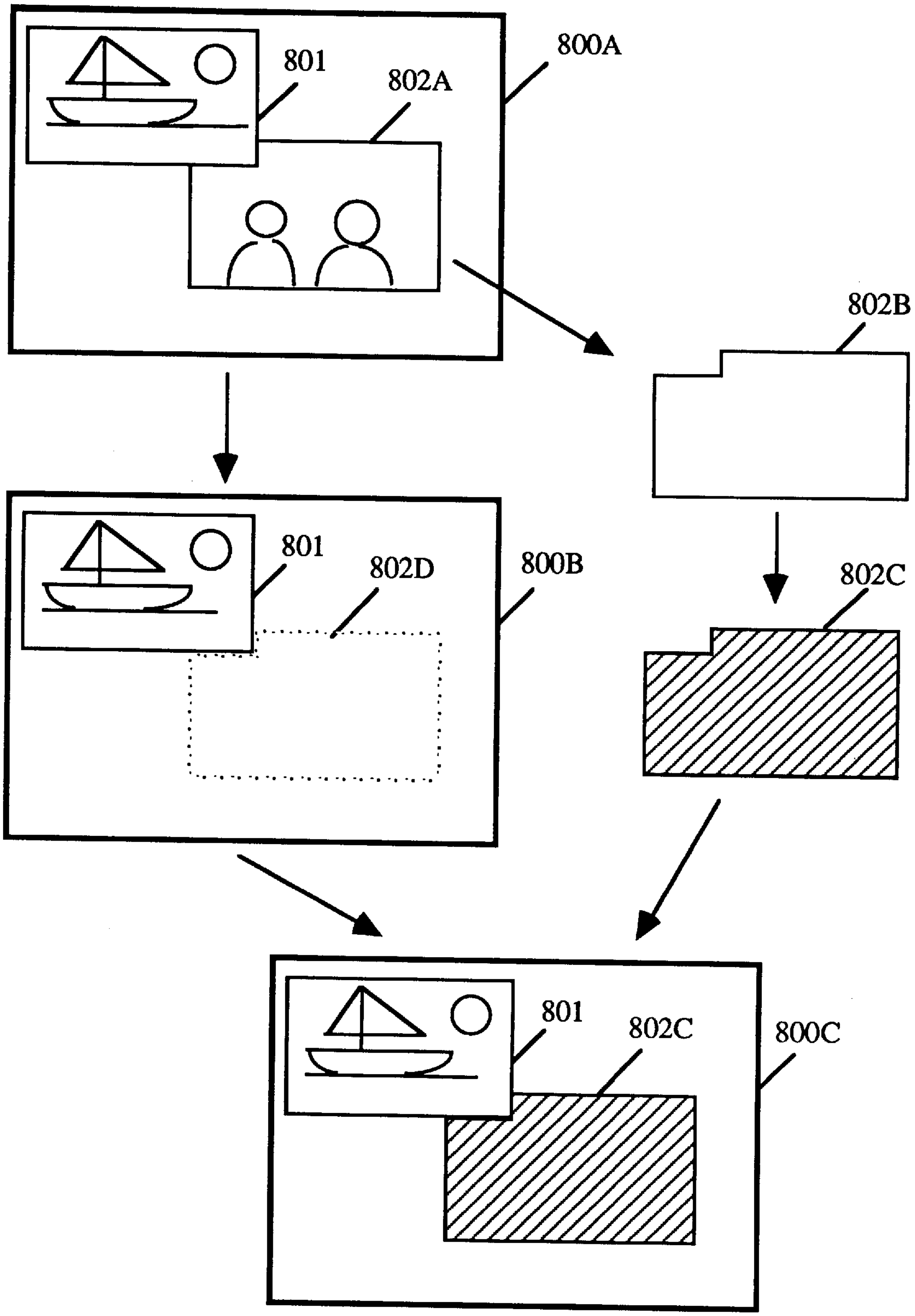
FIG. 8 is a graphic illustration of the image blocking operation of the present invention.

FIG. 8 illustrates the steps shown in FIG. 6 as applied to an example display image. In FIG. 8, image 800A represents a display with two internal windows or image components, images 801 and 802A. Image 801 is not registered for protection with the system, but image 802A is. When a memory transfer is initiated, such as by pressing the "PRINT SCREEN" key, the region defining the protected image is determined from the registered callback functions to be region 802B. The screen transfer succeeds in transferring all unprotected image components, such as image 801, into destination 800B. The image residing in destination 800B is incomplete, lacking any information in region 802D, the region corresponding to the removal of region 802B from the destination. The present invention fills the region of 802B with a pattern or message indicating the image component is protected. This filled region is labeled 802C. The finished transfer is represented by image 800C, comprising copied image 801 and blocked-out image 802C. The present invention also contemplates the blocking out of selected portions of an image as well.

As only the Developer's application can read and decrypt the image files and no application except the Developer's application can copy the image from the screen, the images are substantially protected from theft.

Thus, a method and apparatus for copy protection of images in a computer system have been provided.

Attached hereto as Appendix 1 is a c-code listing of an example embodiment of the present invention.

O.K. to print 9/30/98

Appendix 1

```
#include <windows.h>
#include <winundoc.h>  // From Schulman
#include "prochook.h"
#include <debug.h>
#include "userobj.h"
#include "gdiobj.h"
#include <dos.h>
#include "bitblock.h"
#include "vxd\ipc_call.h"

#define MAXCALLBACKS 30

/* Function prototypes.

   BBH - non exported functions which are hooked into Windows.
   BBE - exported functions which are aliased via the .def file. */

BOOL     __loadds  WINAPI BBHBitBlt             (HDC,  int, int, int, int, HDC, int, int, DWORD);
BOOL     __loadds  WINAPI BBHEndDeferWindowPos  (HDWP);
LRESULT  __loadds  WINAPI BBHDefWindowProc      (HWND, UINT, WPARAM, LPARAM);
LRESULT  __loadds  WINAPI BBHDefFrameProc       (HWND, HWND, UINT, WPARAM, LPARAM);

typedef void (interrupt far *INTRFUNC)(REG_PARAMS);

void MyPaintRgn (HRGN hRgn, COLORREF rgb);

NPHOOKCHILD npHookBitBlt;
NPHOOKCHILD npHookEndDeferWindowPos;
NPHOOKCHILD npHookDefWindowProc;
NPHOOKCHILD npHookDefFrameProc;

HANDLE      hLibInstance;
HANDLE      hProcHookInstance;

typedef struct _BBCALLBACK
  {
    LPCALLBACK alpfnCallback;
    HINSTANCE  hInstance;
  } BBCALLBACK;

BBCALLBACK  Callbacks[MAXCALLBACKS];
BOOL        fHooksInstalled = FALSE;
int         nCallbackFunctions = 0;
LPSTR       lpszMessage = "Protected by bitBLOCKER(tm).  ";

int WINAPI LibMain
  (
    HANDLE  hInstance,
    WORD    wDataSeg,
    WORD    wHeapSize,
    LPSTR   lpCmdLine
  )

{
  hLibInstance = hInstance;

  /* Increase PROCHOOK's lock count so it's still around when
     WEP is executed. */

  hProcHookInstance = LoadLibrary ("PROCHOOK.DLL");

  /* Initialize this PM program's use of the VxD. */

  IpcInitialize ();

  /* Tell the VxD to hook the PM interrupt chain.  The significant
     point here is that we're installing the hook after
     KRNL386 has installed its hook. Because the
     hook resides in the VxD, we don't need to unhook the
     interrupt during this dll's WEP processing. */

  IpcHookInt21h ();

  npHookBitBlt              = SetProcAddress (BitBlt,              BBHBitBlt,              FALSE);
  npHookEndDeferWindowPos   = SetProcAddress (EndDeferWindowPos,   BBHEndDeferWindowPos,   FALSE);
  npHookDefWindowProc       = SetProcAddress (DefWindowProc,       BBHDefWindowProc,       FALSE);
  npHookDefFrameProc        = SetProcAddress (DefFrameProc,        BBHDefFrameProc,        FALSE);

  fHooksInstalled = TRUE;
  return 1;
}

void WINAPI WEP
  (
    int nParameter
  )

{
  /* Under 3.1, there's enough stack to call functions. */

  if (fHooksInstalled)
    {
      SetProcRelease (npHookBitBlt);
      SetProcRelease (npHookEndDeferWindowPos);
      SetProcRelease (npHookDefWindowProc);
      SetProcRelease (npHookDefFrameProc);
    }

  FreeLibrary (hProcHookInstance);
  return;
}

int WINAPI OpenBitBlocker
  (
    //FARPROC lpfnCallback (int, HWND FAR *)
    LPCALLBACK lpfnCallback
  )

{
  int       i;
  HINSTANCE hInstance;

  _asm
    {
      mov ax, [bp-2]    ; Get the caller's
      mov hInstance, ax;   hInstance (SS)
    }

  for (i = 0; i < nCallbackFunctions; i++)
    if (!Callbacks[i].alpfnCallback)
      {
        Callbacks[i].alpfnCallback = lpfnCallback;
        Callbacks[i].hInstance     = hInstance;
        return (1);
      }

  if (nCallbackFunctions >= MAXCALLBACKS)
    return (-1);

  nCallbackFunctions++;

  Callbacks[i].alpfnCallback = lpfnCallback;
  Callbacks[i].hInstance     = hInstance;

  //DebugPrintf ("adding hinstance %.4X", hInstance);
  return (1);
}

int WINAPI CloseBitBlocker
  (
    int i
  )

{
  if (i < 0 || i > nCallbackFunctions)
    return (-1);

  Callbacks[i].alpfnCallback = NULL;
  return (0);
}

/* Not exported */

BOOL __loadds WINAPI BBHBitBlt
  (
    HDC   hdcDest,
    int   nXDest,
    int   nYDest,
    int   nWidth,
    int   nHeight,
    HDC   hdcSrc,
    int   nXSrc,
    int   nYSrc,
    DWORD dwRop
  )

{
  BOOL  fReturn;
  int   i, j, nDCState;
  HRGN  hOldCombinedRgn, hNewCombinedRgn, hVisibleRgn, hIntersectRgn, hOldClippingRgn, hNewClippingRgn,
          hMoveFromRgn;
  HWND  hWndCurr, hWndPrev, hWndBlock;
  RECT  rectPrev, rectDest, rectSrc, rectBlock, rectIntersect, rectIntersect2;
  DWORD dw, dwDestDCOrg, dwSrcDCOrg, dwBlockDCOrg;
  HDC   hDC, hdcBlock;
  HINSTANCE hInstance;
  SIZE  size;
  POINT pt;
  LOGFONT logfont;
  HFONT   hOldFont, hFont;
  TEXTMETRIC tm;
  HANDLE  hDCSDest;
  WORD    wDS1, wDS2;

_asm  mov  ax, ds
_asm  mov  wDS1, ax

  _asm
    {
      mov ax, [bp-2]    ; Get the caller's
      mov hInstance, ax;   hInstance
    }

  ProcUnhook(npHookBitBlt);

  /* If there are no installed callback functions, then there must be no copyrighted
     images to protect.  Also if there's no source DC then the ROP code must be
     something that doesn't involve any source DC. */

  if (!nCallbackFunctions || !hdcSrc)
```

BITBLOCK.C 8-11-94 2:24p printed Aug 11, 1994 at 15:41

Page 1 of 4

IS/14PRINT

```
  {
    fReturn = BitBlt (hdcDest, nXDest, nYDest, nWidth, nHeight, hdcSrc, nXSrc, nYSrc, dwRop);

    ProcHook (npHookBitBlt);

    return (fReturn);
  }

//DebugPrintf ("BitBlt called by instance %.4X", hInstance);

/* We'll add to hOldCombinedRgn all regions from any visible popup windows that we want to
   remove from hdcDest's clipping region. */

hOldCombinedRgn = CreateRectRgn (0, 0, 0, 0);
hNewCombinedRgn = CreateRectRgn (0, 0, 0, 0);

/* Don't waste any time if the source DC has no visible region. */

hVisibleRgn = InquireVisRgn (hdcSrc);

if (hVisibleRgn)
  {
    /* If any bounding rectangles intersect, then go through the effort of computing intersecting
       regions. */

    //GetRgnBox (hVisibleRgn, &rectSrc);                          /* rectSrc in device units */

          /* Get rectSrc, which will be in device units */

    rectSrc.left   = nXSrc;
    rectSrc.right  = nXSrc + nWidth;
    rectSrc.top    = nYSrc;
    rectSrc.bottom = nYSrc + nHeight;

    //DebugPrintf ("\nVisible rgn rect (w/o offset) = (%3d, %3d, %3d, %3d)", rectSrc.left, rectSrc.top,
        rectSrc.right, rectSrc.bottom);

    //DebugPrintf ("\nSource rect (w/o offset)      = (%3d, %3d, %3d, %3d)", rectSrc.left, rectSrc.top,
        rectSrc.right, rectSrc.bottom);

//     dwSrcDCOrg = GetDCOrg (hdcSrc);
//     OffsetRect (&rectSrc, LOWORD (dwSrcDCOrg), HIWORD (dwSrcDCOrg));   /* rectSrc now in screen units */

    //DebugPrintf ("\nSource rect (w/ offset)       = (%3d, %3d, %3d, %3d)", rectSrc.left, rectSrc.top,
        rectSrc.right, rectSrc.bottom);

    /* For every window containing a copyrighted image, check to see if there are intersecting regions. */

    for (i = 0; i < nCallbackFunctions; i++)
      {
        if (!Callbacks[i].alpfnCallback)
          continue;

        /* An application may BitBlt a bitmap from any source DC to any destination DC, even if the
           source DC contains a protected bitmap, so long as the instance handle of the module
           performing the BitBlt is the same as the instance handle of the module that is
           enumerating the protected windows.  For example, assume FotoAttacher is running.  The
           window that FotoAttacher displays is attached to application A's caption bar.  Because
           FotoAttacher subclasses app A (remember, FotoAttacher is a DLL, not an EXE), FotoAttacher
           executes within the same task as app A.  Does that mean that app A can copy the image
           displayed by FotoAttacher?  No!  Why?  Because app A and
           FotoAttacher have unique instance handles even though they're executing within the
           same task (remember, an instance handle is just a modules default data segment). The
           image displayed by FotoAttacher is associated with FotoAttacher's instance handle even
           though the image is displayed within app A's window frame. */

        if (Callbacks[i].hInstance == hInstance)
          continue;

        j = 0;   /* Initialize the callback */

        while (TRUE)
          {
            j = Callbacks[i].alpfnCallback (j, &hWndBlock);

_asm  mov  ax, ds
_asm  mov  wDS2, ax

if (wDS1 != wDS2)
  _asm int 1

            if (!j)
              break;

        //while (j = Callbacks[i].alpfnCallback (j, &hWndBlock))
        //  {
            /* Forget about invisible windows.  A window that is visible
               and then becomes completely obscurred by another window
               is still considered visible by Windows. */

            if (!IsWindow (hWndBlock) || !IsWindowVisible (hWndBlock))
              continue;

            GetWindowRect (hWndBlock, &rectBlock);     /* rectBlock in screen units */

            dwSrcDCOrg = GetDCOrg (hdcSrc);
            OffsetRect (&rectBlock, - (int) LOWORD (dwSrcDCOrg), - (int) HIWORD (dwSrcDCOrg));    /*
                rectBlock now in device units */

            //DebugPrintf ("  hwndBlock = %.4X, rectBlock = (%3d, %3d, %3d, %3d)", hWndBlock,
                rectBlock.left, rectBlock.top, rectBlock.right, rectBlock.bottom);

            /* Does any portion of the source DC and the popup window intersect? */

            if (IntersectRect (&rectIntersect, &rectSrc, &rectBlock))
              {
                //DebugPrintf ("  Intersect rect           = (%3d, %3d, %3d, %3d)", rectIntersect.left,
                    rectIntersect.top, rectIntersect.right, rectIntersect.bottom);

                /* The source DC and the popup window intersect.  That means that some action must be taken
                    such that part
                  (or all) of what is being copied (i.e. the intersect region) is prevented from reaching
                      the destination
                  DC.  Because the dimensions of the source (nWidth X nHeight) are equal to the dimensions
                      of the destination
                  (that is NOT the same thing as saying that the dimensions of hdcDest are equal to the
                      dimensions of
                  hdcSource) it is clear that, with no clipping region, the entire source would be copied
                      to the entire destination.
                  Thus, the intersect rectangle would also be copied to the destination.  However, the
                      destination clipping region
                  may be so small that the portion of the source which would be copied to the destination
                      may exclude the
                  intersect rectangle.  If that's the case, then it's ok to let the BitBlt proceed.

                  If the region that we want excluded from the BitBlt happens to fall outside of the
                      destination DC's
                  clipping rectangle, then we don't need to do any work to exclude those regions.  They'll
                      be excluded
                  by BitBlt.  Does any portion of the resultant intersection and
                  the destination DC's clipping rectangle intersect? */

                GetClipBox (hdcDest, &rectDest);                                   /* rectDest in device
                    units */
                OffsetRect (&rectIntersect, - rectSrc.left, - rectSrc.top);  /* rectIntersect now relative
                    to upper left corner of rectSrc */

                if (IntersectRect (&rectIntersect2, &rectDest, &rectIntersect))
                  {
                    /* The source DC's "move from" rectangle, the popup window and the destination DC's
                        clipping rectangle
                      do intersect.  Now we know that it's reasonable to go through all of the effort to
                          compute
                      an intersection region.  The intersection rectangle is too inclusive and would cause
                          portions of the
                      destination DC to not be BitBlt'ed that really need to be BitBlt'ed.   */

                    hdcBlock = GetWindowDC (hWndBlock);

                    hVisibleRgn = InquireVisRgn (hdcBlock);  /* Apparently hVisibleRgn is in screen units
                        ????*/

                    /* Display the visible region of each protected window. */

                    //MyPaintRgn (hVisibleRgn, RGB (255, 0, 0));

                    CombineRgn (hNewCombinedRgn, hOldCombinedRgn, hVisibleRgn, RGN_OR);
                    ReleaseDC (hWndBlock, hdcBlock);

                    hOldCombinedRgn ^= hNewCombinedRgn;
                    hNewCombinedRgn ^= hOldCombinedRgn;
                    hOldCombinedRgn ^= hNewCombinedRgn;

                  } // end if (IntersectRect (&rectIntersect2, &rectDest, &rectIntersect))
              } // end if (IntersectRect (&rectIntersect, &rectSrc, &rectBlock))
          } // end while (j = CALLBACK (j, &hWndBlock))
      } // end for (i = 0; i < nCallbackFunctions; i++)
  } // end if (hVisibleRgn)

_asm  mov  ax, ds
_asm  mov  wDS2, ax

if (wDS1 != wDS2)
  _asm int 1
  /* We want to know if hOldCombinedRgn is NULL.  Any rect will do. */

  if (GetRgnBox (hOldCombinedRgn, &rectIntersect) == NULLREGION)
    {
      DeleteObject (hOldCombinedRgn);
      DeleteObject (hNewCombinedRgn);

      fReturn = BitBlt (hdcDest, nXDest, nYDest, nWidth, nHeight, hdcSrc, nXSrc, nYSrc, dwRop);

      ProcHook (npHookBitBlt);

      return (fReturn);
    }

  //DebugBreak ();
  //MyPaintRgn (hOldCombinedRgn, RGB (255, 0, 0));

  /* hOldCombinedRgn consists of the union of individual regions, each of which intersects
     (either partially or completely) the "move from" region of the source DC and the
     clipping region of the destination DC.  hOldCombinedRgn is in screen units.  We create
     a rectangular region consisting of the "move to" region of the destination DC in screen
     units.  We then compute the intersection of this region and hOldCombinedRgn.  This
     new resultant region is then offset such that its units are those of the
     destination DC's device units.  We then subtract this region from the destinations
     DC's clipping region. */
```

```
dwSrcDCOrg = GetDCOrg (hdcSrc);
hMoveFromRgn = CreateRectRgn (LOWORD (dwSrcDCOrg) + nXSrc,
                              HIWORD (dwSrcDCOrg) + nYSrc,
                              LOWORD (dwSrcDCOrg) + nXSrc + nWidth,
                              HIWORD (dwSrcDCOrg) + nYSrc + nHeight);  /* Device units */

CombineRgn (hNewCombinedRgn, hOldCombinedRgn, hMoveFromRgn, RGN_AND);

//MyPaintRgn (hNewCombinedRgn, RGB (0, 255, 0));

DeleteObject (hOldCombinedRgn);
DeleteObject (hMoveFromRgn);

/* Convert hNewCombinedRgn from screen units to device units,
   relative to the dest DC. */

dwDestDCOrg = GetDCOrg (hdcDest);
dwSrcDCOrg  = GetDCOrg (hdcSrc);

OffsetRgn (hNewCombinedRgn,
           ((int) LOWORD (dwDestDCOrg) + nXDest) - ((int) LOWORD (dwSrcDCOrg) + nXSrc),
           ((int) HIWORD (dwDestDCOrg) + nYDest) - ((int) HIWORD (dwSrcDCOrg) + nYSrc));  /* hNewCombinedRgn
               now back in device units */

//MyPaintRgn (hNewCombinedRgn, RGB (0, 0, 255));

if (!(hOldClippingRgn = GetClipRgn (hdcDest)))
  {
    GetClipBox (hdcDest, &rectIntersect);                          /* rectIntersect in device units */
    hOldClippingRgn = CreateRectRgnIndirect (&rectIntersect);      /* hOldClippingRgn still in device units */
  }

hNewClippingRgn = CreateRectRgn (0, 0, 0, 0);

/* Remove from the destination DC's clipping region the region that corresponds to the visible portion of
   copyrighted images in the source DC. */

CombineRgn (hNewClippingRgn, hOldClippingRgn, hNewCombinedRgn, RGN_DIFF);
_asm  mov  ax, ds
_asm  mov  wDS2, ax

if (wDS1 != wDS2)
  _asm int 1

nDCState = SaveDC (hdcDest);

/* Stuff the new clipping region into the DC */

SelectClipRgn (hdcDest, hNewClippingRgn);

fReturn = BitBlt (hdcDest, nXDest, nYDest, nWidth, nHeight, hdcSrc, nXSrc, nYSrc, dwRop);

/* Now replace the clipping region (which is everything but the combined region) with
   only the combined region.  Then we'll BitBlt black into hdcDest. */

SelectClipRgn (hdcDest, hNewCombinedRgn);

_asm  mov  ax, ds
_asm  mov  wDS2, ax

if (wDS1 != wDS2)
  _asm int 1

BitBlt (hdcDest, nXDest, nYDest, nWidth, nHeight, NULL, 0, 0, BLACKNESS);

_asm  mov  ax, ds
_asm  mov  wDS2, ax

if (wDS1 != wDS2)
  _asm int 1

logfont.lfHeight          = 16;
logfont.lfWidth           = 0;
logfont.lfEscapement      = 0;
logfont.lfOrientation     = 0;
logfont.lfWeight          = FW_REGULAR;
logfont.lfItalic          = 0;
logfont.lfUnderline       = 0;
logfont.lfStrikeOut       = 0;
logfont.lfCharSet         = ANSI_CHARSET;
logfont.lfOutPrecision    = OUT_DEFAULT_PRECIS; //OUT_TT_PRECIS;
logfont.lfClipPrecision   = CLIP_DEFAULT_PRECIS; //CLIP_TT_ALWAYS;
logfont.lfQuality         = DEFAULT_QUALITY;
logfont.lfPitchAndFamily  = DEFAULT_PITCH; //DEFAULT_PITCH | FF_SWISS;
lstrcpy (logfont.lfFaceName, "Arial");

_asm  mov  ax, ds
_asm  mov  wDS2, ax

if (wDS1 != wDS2)
  _asm int 1

SetMapMode (hdcDest, MM_TEXT);
hFont = CreateFontIndirect (&logfont);

SelectObject (hdcDest, hFont);

GetTextMetrics (hdcDest, &tm);

_asm  mov  ax, ds
_asm  mov  wDS2, ax

if (wDS1 != wDS2)
  _asm int 1

dw = GetTextExtent (hdcDest, lpszMessage, lstrlen (lpszMessage));
SetTextAlign (hdcDest, TA_LEFT | TA_TOP | TA_UPDATECP);
SetBkColor   (hdcDest, RGB (0,   0,   0));
SetTextColor (hdcDest, RGB (255, 255, 255));

for (i = 0; i < nHeight / tm.tmHeight + 1; i++)
  {
    MoveTo (hdcDest,
            (i % (LOWORD (dw) / 3)) * 3 - (int) LOWORD (dw),
            i * tm.tmHeight);

    for (j = 0; j < nWidth / (int) LOWORD (dw) + 2; j++)
      ExtTextOut (hdcDest, 0, 0,
                  0,
                  NULL,
                  lpszMessage,
                  lstrlen (lpszMessage),
                  NULL);

  }

RestoreDC (hdcDest, nDCState);

DeleteObject (hFont);
DeleteObject (hNewCombinedRgn);
DeleteObject (hOldClippingRgn);
DeleteObject (hNewClippingRgn);

ProcHook(npHookBitBlt);

return (fReturn);
}

void MyPaintRgn (HRGN hRgn, COLORREF rgb)
{
  HBRUSH hbrBrush, hbrOldBrush;
  HDC    hDC;
  RECT   rect;
  int    i;

  hDC = GetDC (NULL);

  i = SaveDC (hDC);

  SelectObject (hDC, hRgn);

  hbrBrush = CreateSolidBrush (rgb);

  hbrOldBrush = SelectObject (hDC, hbrBrush);

  PaintRgn (hDC, hRgn);

  SelectObject (hDC, hbrOldBrush);

  RestoreDC (hDC, i);

  DeleteObject (hbrBrush);
  ReleaseDC (NULL, hDC);
}

BOOL __loadds WINAPI BBHEndDeferWindowPos
  (
    HDWP  hDwp
  )

{
  BOOL fReturn;

  ProcUnhook (npHookEndDeferWindowPos);
  ProcUnhook (npHookBitBlt);

  fReturn = EndDeferWindowPos (hDwp);

  ProcHook (npHookEndDeferWindowPos);
  ProcHook (npHookBitBlt);

  return (fReturn);
}

LRESULT __loadds WINAPI BBHDefWindowProc
  (
    HWND    hWnd,
    UINT    lMessage,
    WPARAM  wParam,
    LPARAM  lParam
  )

{
  LRESULT lReturn;

  ProcUnhook (npHookDefWindowProc);
  ProcUnhook (npHookBitBlt);

  lReturn = DefWindowProc (hWnd, lMessage, wParam, lParam);
```

LS/14PRINT 73000.911

```
  ProcHook (npHookDefWindowProc);
  ProcHook (npHookBitBlt);

  return (lReturn);
}

LRESULT __loadds WINAPI BBHDefFrameProc
  (
    HWND    hWnd1,
    HWND    hWnd2,
    UINT    iMessage,
    WPARAM  wParam,
    LPARAM  lParam
  )

{
  LRESULT lReturn;

  ProcUnhook (npHookDefFrameProc);
  ProcUnhook (npHookBitBlt);

  lReturn = DefFrameProc (hWnd1, hWnd2, iMessage, wParam, lParam);

  ProcHook (npHookDefFrameProc);
  ProcHook (npHookBitBlt);

  return (lReturn);
}
```

```
#include <windows.h>
#include "bitblock.h"
#include <debug.h>

extern const HINSTANCE _hModule;

LRESULT CALLBACK  DriverProc
  (
   DWORD   dwDriverIdentifier,
   HDRVR   hDriver,
   UINT    wMessage,
   LPARAM  lParam1,
   LPARAM  lParam2
)

{
  DWORD dwRes = 0L;
  char   szBuffer[50];

  switch (wMessage)
    {
      case DRV_LOAD:
        /* Sent when the driver is loaded. This is always   */
        /* the first message received by a driver.          */

        if (!(/* hLibModule = */ GetModuleHandle ("BITBLOCK.DLL")))
          {
            MessageBox (NULL, "Unable to locate module BITBLOCK.DLL.  Product not installed correctly",
                  "BITBLOCK", MB_ICONSTOP | MB_OK);
            dwRes = 0L;
            break;
          }

        dwRes = 1L;
        break;

      case DRV_FREE:
        /* Sent when the driver is about to be discarded.   */

        /* This is the last message a driver receives       */
        /* before it is freed.                              */

        dwRes = 1L;      /* Return value is ignored.        */
        break;

      case DRV_OPEN:
        /* Sent when the driver is opened.                  */

        dwRes = 1L;      /* Return 0L to fail.              */
                         /* This value is subsequently used */
                         /* for dwDriverIdentifier.         */

        break;

      case DRV_CLOSE:
        /* Sent when the driver is closed. Drivers are      */
        /* unloaded when the open count reaches zero.       */

        dwRes = 1L;      /* Return 0L to fail.              */
        break;

      case DRV_ENABLE:
        /* Sent when the driver is loaded or reloaded and   */
        /* when Windows is enabled. Hook or rehook          */
        /* interrupts and initialize hardware. Expect the   */
        /* driver to be in memory only between the enable   */
        /* and disable messages.                            */

        dwRes = 1L;      /* Return value is ignored.        */
        break;

      case DRV_DISABLE:
        /* Sent before the driver is freed or when Windows  */
        /* is disabled. Unhook interrupts and place         */
        /* peripherals in an inactive state.                */

        dwRes = 1L;      /* Return value is ignored.        */
        break;

      case DRV_INSTALL:
        /* Sent when the driver is installed.               */

        dwRes = DRVCNF_OK; /* Can also return DRV_CANCEL       */
                           /* and DRV_RESTART.                 */

        break;

      case DRV_REMOVE:
        /* Sent when the driver is removed.                 */


        dwRes = 1L;      /* Return value is ignored.        */
        break;

      case DRV_QUERYCONFIGURE:
        /* Sent to determine if the driver can be           */
        /* configured.                                      */

        dwRes = 0L;      /* Zero indicates configuration    */
                         /* NOT supported.                  */
        break;

      case DRV_CONFIGURE:
        /* Sent to display the custom-configuration         */
        /* dialog box for the driver.                       */

        dwRes = DRVCNF_OK; /* Can also return DRV_CANCEL        */
                           /* and DRV_RESTART.                  */
        break;

      default:
        /* Process any messages not explicitly trapped.     */

        return DefDriverProc (dwDriverIdentifier,
                              hDriver,
                              wMessage,
                              lParam1,
                              lParam2);
    }

  return dwRes;
}
```

```
.386 include procntrc.inc

DGROUP  group _DATA

CallVxD MACRO   msg
local   a
        mov     eax, msg
        cmp     [VxdCallAddr], 0
        je      short a
        call    dword ptr [VxDCallAddr]
a:
ENDM _DATA   segment dword use16 public 'DATA'
assume  ds:DGROUP VxDCallAddr     dd      ?
VmHdl           dd      ?
FirstTime       dw      1

_DATA   ends

_TEXT   segment dword use16 public 'CODE'
        assume  cs:_TEXT public  _IpcRegister
        public  _IpcMsgPeek
        public  _IpcMsgRead
        public  _IpcMsgDone
        public  _IpcSuspend
        public  _IpcInitialize
        public  _IpcHookInt21h ; long IpcRegister (char far *pDosCmdBuf);

_IpcRegister    proc near
assume  cs:_TEXT, ds:DGROUP

;       ; Is Windows386 3.0+ running?
;       mov     ax, 1600h
;       int     2Fh
;       test    al, 7Fh
;       jnz     short ir20                      ; We have Windows 386
;
;ir10:  xor     eax, eax                        ; No Windows 3.0/386
;       jmp     short ir30
;
;ir20:  cmp     al, 1
;       je      ir10                            ; Win386 2.0
;       cmp     al, -1
;       je      ir10                            ; Win386 2.0

; Give Vxd our ID
        ; ENTRY:        AX = MSG_REGISTER
        ;               EDX = lpfnMsgProc
        ; EXIT:         EAX = hVm
        push    bp
        mov     bp, sp
        mov     edx, [bp+4]
        pop     bp CallVxD MSG_REGISTER mov     [VmHdl], eax ir30:   mov     edx, eax                        ; rtn VM
        shr     edx, 16
        ret _IpcRegister    endp ; unsigned int IpcMsgPeek (MSG far *pMsg);

_IpcMsgPeek     proc near
assume  cs:_TEXT, ds:DGROUP

; ENTRY:        AX = MSG_PEEK
        ;               EDX = pMsg
        ; EXIT:         AX = uErr push    bp
        mov     bp, sp
        mov     edx, [bp+4]
        pop     bp CallVxD MSG_PEEK ret _IpcMsgPeek     endp ; BOOL IpcMsgRead (MSG far *pMsg);

_IpcMsgRead     proc near
assume  cs:_TEXT, ds:DGROUP

; ENTRY:        AX = MSG_READ
        ;               EDX = pMsg
        ; EXIT:         AX = uErr
        push    bp
        mov     bp, sp
        mov     edx, [bp+4]
        pop     bp CallVxD MSG_READ ret _IpcMsgRead     endp ; void IpcMsgDone (void);

_IpcMsgDone     proc near
assume  cs:_TEXT, ds:DGROUP

; ENTRY:        AX = MSG_DONE
        ; EXIT:         AX = uErr

CallVxD MSG_DONE ret

_IpcMsgDone     endp

; unsinged int IpcSuspend (void);

_IpcSuspend     proc near
assume  cs:_TEXT, ds:DGROUP

; ENTRY:        AX = MSG_DONE
        ; EXIT:         AX = fContinue

CallVxD MSG_SUSPEND ret

_IpcSuspend     endp

; unsinged int IpcHookInt21h (void);

_IpcHookInt21h  proc near
assume  cs:_TEXT, ds:DGROUP

; ENTRY:        AX = MSG_DONE
        ; EXIT:         AX = fContinue

CallVxD MSG_HOOKINT21H ret

_IpcHookInt21h  endp

_IpcInitialize  proc near
assume  cs:_TEXT, ds:DGROUP

; Get the call address push    es                              ;save es xor     di, di                          ;zero di
        mov     es, di                          ;zero es
        mov     ax, 1684h
        mov     bx, PROCNTRC_DEVICE_ID
        int     2Fh                             ;get address in es:di
        mov     word ptr [VxDCallAddr], di      ;save it
        mov     word ptr [VxDCallAddr+2], es    ;  VxDCallAddr
        pop     es                              ;restore saved es xor     eax, eax
        cmp     [VxDCallAddr], eax              ;did the call fail
        jne     short Have_Addr                 ;no, signal success
        ret                                     ;yes, signal failure (ax = 0)

Have_Addr:
        mov     ax, 1
        ret                                     ;return ax = 1

_IpcInitialize  endp

_TEXT   ends end
```

DOS_CALL.ASM 7-30-94 10:01a printed Aug 11, 1994 at 15:43

```
        page    60, 132

;******************************************************************************
        title   PROCNTRC - A simple virtual device driver example
;******************************************************************************
;
;   (C) Copyright Procentric Computer Services, Inc., 1994
;
;   Title:      PROCNTRC.386 - Sample virtual device driver
;
;   Module:     PROCNTRC.ASM - Core code
;
;   Version:    1.00
;
;   Date:       July 15, 1994
;
;   Author:     Michael B. Mast
;
;******************************************************************************
;
;   Change log:
;
;   DATE        REVISION    DESCRIPTION                                 AUTHOR
;   --------    --------    ----------------------------------------    ----------
;   07/15/94    1.00        Wrote it.                                   MBM
;
;******************************************************************************
;
;   Functional Description:
;
;
;
;   Ideas:
;
;       1.  Provide exported API to unmap pages/remap pages for added
;           security
;
;******************************************************************************

        .386p

;******************************************************************************
;                     I N C L U D E S   &   E Q U A T E S
;******************************************************************************

        .XLIST
        INCLUDE VMM.Inc
        INCLUDE Debug.Inc
        INCLUDE VB6MMGR.Inc
        INCLUDE PROCNTRC.INC
        .LIST

PROCNTRC_Major_Ver          equ     03h
PROCNTRC_Minor_Ver          equ     0Ah
Dos_Open_H                  equ     3dh
Dos_Read_H                  equ     3fh
Dos_Close_H                 equ     3eh
Dos_Set_PSP_H               equ     50h
Dos_Load_Execute_X          equ     4b00h
Dos_Move_File_Ptr_H         equ     42h
Dos_Get_File_Date_Time_X    equ     5700h
Dos_End_Program_H           equ     4ch
Dos_Terminate_Program_H     equ     00h

;******************************************************************************
;             V I R T U A L   D E V I C E   D E C L A R A T I O N
;******************************************************************************

Declare_Virtual_Device  PROCNTRC,\
                        PROCNTRC_Major_Ver,\
                        PROCNTRC_Minor_Ver,\
                        PROCNTRC_Control_Proc,\
                        PROCNTRC_Device_ID,\
                        Undefined_Init_Order,\
                        PROCNTRC_V86_API_Proc,\
                        PROCNTRC_PM_API_Proc

;******************************************************************************
;                             D E V I C E   D A T A
;******************************************************************************

VxD_DATA_SEG

szMessage db "Got Int21"
szID      db "Allocated by the VxD!"
nIDSize   equ $ - szID
          db 0Dh, 0Ah

wBufSel   dw 0
wBufOff   dw 0
wInHook   dw 0

Old_I21h_Vector_CS  dd ?
Old_I21h_Vector_EIP dd ?
BufAddr         dd 0
pFileName       dd ?
pV86Data        dd 0    ;Global V86 data area
pPMData         dd 0    ;Windows PM data area
pSegOff         dd 0    ;seg:off of global V86 data area
lpfnMsgProc     dd 0
hFileHandle  dw ?
wCurPSPAddr     dw ?
wFilePSPAddr dw ?
szTxt        db "TXT"
szFileName   db 128 DUP (?)
fLoadExecute dw 0
bCount       db ?
lNewExeAddr  dd ?
lCurExeID    dd ?

Save_Client_DX dw ?
Save_Client_DS dw ?

I21_Map_Stuff:
    Xlat_API_Var_Len   ds, dx, cx
    Xlat_API_Exec_Int  21h

Max_STATE_HANDLERS          equ     5


MsgDispTable        label   dword
            dd      offset32        MsgGetVer
            dd      offset32        MsgRegister
            dd      offset32        MsgPost
            dd      offset32        MsgPeek
            dd      offset32        MsgRead
            dd      offset32        MsgDone
            dd      offset32        MsgSuspend
            dd      offset32        MsgHookInt21h
NumMsgDisp          EQU     ($ - MsgDispTable) / 4


SysVm               dd      0
DosVm               dd      0

MsgGet              dd      0                   ; Next Message to read
MsgPut              dd      0                   ; Next free spot
MsgLast             dd      0                   ; Next == Free -> empty
MsgArr              db      ((size DosMsg) * MAX_DOS_MSG) dup (?)
MsgSem              dd      0
VxdSem              dd      0


Msg                 DosMsg <>
ExeIDTable          EXEPSP 100 DUP (<>)     ; Room for 100 concurrently
                                            ; executing programs
ktTable             KEYTABLE MAXCUST DUP (<>)

VxD_DATA_ENDS

;******************************************************************************
;                                   I C O D E
;******************************************************************************

VxD_ICODE_SEG

;------------------------------------------------------------------------------
;
;   PROCNTRC_Sys_Critical_Init
;
;   Description:
;       On entry, interrupts are disabled.  Critical initialization
;       for this VxD should occur here.  For example, we can read
;       settings from VMM's cached copy of the SYSTEM.INI and act
;       set up our VxD as appropriate.
;
;       This procedure is called when the PROCNTRC_Control_Proc
;       dispatches the Sys_Critical_Init notification from VMM.
;
;       We can notify VMM of failure by returning with carry set
;       or carry clear will suggest success.
;
;------------------------------------------------------------------------------

BeginProc PROCNTRC_Sys_Critical_Init

        Trace_Out "PROCNTRC: Sys_Critical_Init #ebx"


        VMMcall Get_Sys_VM_Handle               ; Save System VM
        mov     SysVm, ebx                      ; Save System VM

; Initialize the message queue

        mov     ecx, OFFSET32 MsgArr            ; Get address of message array
        mov     MsgGet, ecx                     ; Next address to get from
        mov     MsgPut, ecx                     ; Next address to put to
        mov     eax, MAX_DOS_MSG - 1            ; Get
        mov     edx, size DosMsg                ;   address
        mul     edx                             ;     of
        add     eax, ecx                        ;       last
        mov     MsgLast, eax                    ;         array entry
        clc
        ret

EndProc PROCNTRC_Sys_Critical_Init

;------------------------------------------------------------------------------
;
;   PROCNTRC_Device_Init
```

```
;
;   Description:
;      This is a non-system critical initialization procedure.
;      IRQ virtualization, I/O port trapping and VM control
;      block allocation can occur here.
;
;      Again, the same return value applies...
;      CLC for success, STC for error notification.
;
;-----------------------------------------------------------------------------

BeginProc PROCNTRC_Device_Init

        Trace_Out "PROCNTRC: Device_Init"

; Hook the front end of V86 mode Int 21

        pushad
        mov     eax, 21h
        mov     esi, OFFSET32 PROCNTRC_V86_I21h_Hook
        VMMCall Hook_V86_Int_Chain
        popad

; Allocate read buffer

        ;VMMCall _Allocate_Global_V86_Data_Area (4096*16, GVDAPageAlign+GVDAInstance)
        VMMCall _Allocate_Global_V86_Data_Area (4096*16, GVDAPageAlign)

        mov     pV86Data, eax                   ; Save linear address of V86 read buffer

; Create the semaphore for messaging

        xor     ecx, ecx                        ; Set up Msg semaphore
        VMMcall Create_Semaphore
        ;Jc     vmci0
        mov     MsgSem, eax

        xor     ecx, ecx                        ; Set up Vxd semaphore
        VMMcall Create_Semaphore
        ;Jc     vmci0
        mov     VxdSem, eax

        clc
        ret

EndProc PROCNTRC_Device_Init

BeginProc PROCNTRC_VM_Terminate

        Trace_Out "PROCNTRC: VM_Terminate"

        clc
        ret

EndProc PROCNTRC_VM_Terminate

BeginProc PROCNTRC_Sys_VM_Terminate

        Trace_Out "PROCNTRC: Sys_VM_Terminate"

        clc
        ret

EndProc PROCNTRC_Sys_VM_Terminate

VxD_ICODE_ENDS

VxD_LOCKED_CODE_SEG

;=============================================================================
;                      N O N P A G E A B L E   C O D E
;=============================================================================

;-----------------------------------------------------------------------------
;
;   PROCNTRC_Control_Proc
;
;   DESCRIPTION:
;       Dispatches VMM control messages to the appropriate handlers.
;
;   ENTRY:
;       EAX = Message
;       EBX = VM associated with message
;
;   EXIT:
;       Carry clear if no error (or if not handled by the VxD)
;       or set to indicate failure if the message can be failed.
;
;   USES:
;       All registers.
;
;-----------------------------------------------------------------------------

BeginProc PROCNTRC_Control_Proc

          Control_Dispatch VM_Not_Executeable, PROCNTRC_VM_Not_Executeable
          Control_Dispatch Sys_Critical_Init,  PROCNTRC_Sys_Critical_Init
          Control_Dispatch Device_Init,        PROCNTRC_Device_Init
;          Control_Dispatch VM_Terminate        PROCNTRC_VM_Terminate
;          Control_Dispatch Sys_VM_Terminate    PROCNTRC_Sys_VM_Terminate

          clc
          ret

EndProc PROCNTRC_Control_Proc

BeginProc PROCNTRC_VM_Not_Executeable
          cmp  ebx, DosVm                       ; Is the server VM shutting down?
          jne  short vmt60                      ; No, just exit

          xor  eax, eax                         ; Yes,
          mov  DosVm, eax                       ;    zero DosVm
vmt60:    clc
          ret

EndProc PROCNTRC_VM_Not_Executeable

BeginProc PROCNTRC_V86_I21h_Hook, High_Freq

        cmp     winHook, 1
        je      V86_I21h_Exit

;Front end hook of int 21.  If we're not the system VM, then chain.

        cmp     ebx, SysVm
        jne     V86_I21h_Exit

;If the server DOS VM isn't running, then chain.

        mov     eax, DosVm
        or      eax, eax
        jz      V86_I21h_Exit

;If we're not opening a file, check to see if we're reading a file

        mov     ax, [ebp.Client_AX]
        mov     cx, [ebp.Client_SS]
        mov     dx, [ebp.Client_DS]

        Trace_Out "In the V86 int 21 hook ax = #ax ss = #cx ds = #dx"

        cmp     ah, Dos_Open_H
        je      short V86_I21h_Dos_Open

        cmp     ah, Dos_Read_H
        je      V86_I21h_Dos_Read

        cmp     ah, Dos_Close_H
        je      V86_I21h_Dos_Close

        cmp     ah, Dos_Set_PSP_H
        je      V86_I21h_Dos_Set_PSP

        cmp     ah, Dos_End_Program_H
        je      V86_I21h_End_Program

        jmp     V86_I21h_Exit

V86_I21h_Dos_Open:

;We're the system VM and we're opening a file.
;DS:DI points to the file name.  Convert it to a flat pointer
;in esi.

        Client_Ptr_Flat esi, DS, DI
        mov     pFileName, esi

;If we're processing a Load and Execute, then save the name
;of the file. It's probably the name of the executable, but
;it could be the name of a .PIF file.  We don't make any
;assumptions about file names.  I.e. we determine that it's
;an executable by the contents of the file, not the file's
;name.

        mov     ax, fLoadExecute
        or      ax, ax
        jz      I21h_DO10

;Find the null terminator

        cld
        mov     edi, pFileName
        mov     ecx, -1
        mov     ax, ds          ;set es
        mov     es, ax          ;  to ds
        xor     ax, ax          ;zero ax
        repne   scasb           ;find the terminating null
        neg     ecx             ;cx = pos (not disp) + 1 of null term
        dec     ecx             ;cx = pos of null term
        dec     ecx             ;cx = disp of null term

; cx contains number of bytes to move

        mov     esi, pFileName
        mov     edi, offset32 szFileName
        rep     movsb

        jmp     V86_I21h_Exit

I21h_DO10:
```

```
;Find the null terminator

        cld
        mov     edi, pFileName
        mov     ecx, -1
        mov     ax, ds          ;set es
        mov     es, ax          ;  to ds
        xor     ax, ax          ;zero ax
        repne   scasb           ;find the terminating null
        neg     ecx             ;cx = pos (not disp) + 1 of null term
        dec     ecx             ;cx = pos of null term
        dec     ecx             ;cx = disp of null term

;Now find the '.' char

        cld
        mov     edi, pFileName
        mov     ax, ds          ;set es
        mov     es, ax          ;  to ds
        mov     al, '.'         ;char to find
        repne   scasb           ;find the '.' char

        jne     V86_I21h_Exit    ;The '.' char was not found

;Now see if we have 'txt'

        cld
        mov     cx, 3
        mov     esi, OFFSET32 [szTxt]
        repe    cmpsb

        jne     V86_I21h_Exit   ;The suffix was not found

;We have a file with the correct suffix.  Hook the back end of
;this interrupt so that we can save the returned file handle .

        xor     eax, eax
        mov     esi, OFFSET32 PROCNTRC_Dos_Open_Iret
        VMMCall Call_When_VM_Returns

        jmp     V86_I21h_Exit

V86_I21h_Dos_Read:

;We're reading a file.  If we're processing a Load and Execute
;function, hook the back end of the read so that we can inspect
;what Windows read.  Otherwise, check to see if the handle of the file
;matches the handle that we saved when we opened a .txt file.

        mov     ax, fLoadExecute
        or      ax, ax
        jz      I21h_DR10

;We're processing a Load and Execute.  Hook the back end.

        xor     eax, eax
        mov     esi, OFFSET32 PROCNTRC_Dos_Read_Iret
        VMMCall Call_When_VM_Returns

        jmp     V86_I21h_Exit

I21h_DR10:
        mov     bx, [ebp.Client_BX]
        cmp     bx, hFileHandle
        jne     V86_I21h_Exit

;The file handle matches.  Make sure it's for the right Windows task
;(which corresponds to the task's PSP)

        mov     bx, wCurPSPAddr     ;Get the current PSP addr
        cmp     bx, wFilePSPAddr    ;Same as when file was opened?
        jne     V86_I21h_Exit           ;Nope, we're reading for a different Windows task

;We're reading a .txt file.  Read the data into our V86 data area.

        movzx   ebx, [ebp.Client_BX]    ;get the file handle
        movzx   ecx, [ebp.Client_CX]    ;get the number of bytes
        mov     edx, pV86Data           ;get the VxD's V86 buffer
        mov     ah, Dos_Read_H

        inc     wInHook                 ;prevent recursion into this hook
        VxDInt  21h                     ;read
        pushfd                          ;save the flags
        dec     wInHook                 ;allow this hook to be entered

        mov     [ebp.Client_AX], ax     ;copy num of bytes read to client
        pop     eax                     ;get saved flags
        mov     [ebp.Client_Flags], ax  ;copy saved flags to client

        Client_Ptr_Flat edi, DS, DX     ;map dest flat
        mov     pPMData, edi            ;save flat dest

        ; Create the message that will be sent (not posted) to the
        ; Decryption Server running in its own VM (DosVM).

        mov     ax, 1                   ;the message
        mov     [Msg.dMsg], ax
        mov     ax, [ebp.Client_AX]     ;the number of bytes read
        mov     [Msg.dwParam], ax
```

```
        mov     eax, pSegOff            ;the seg:off of the data buffer
        mov     [Msg.dlParam], eax

        ; Schedule the SendMessage event in the VM (DosVm).
        ; I don't yet understand why this works.  Specifically,
        ; the event is completly processed (no matter how long it
        ; takes - even if huge do-nothing for loops are introduced)
        ; before the system VM is allowed to run again.  This means
        ; that when the system VM wakes up, it finds completely decrypted
        ; data in its read buffer.

        push    ebx
        mov     eax, High_Pri_Device_Boost
        mov     ebx, DosVm
        mov     ecx, PEF_Wait_For_STI OR PEF_Wait_Not_Crit or PEF_Always_Sched
        mov     esi, OFFSET32 PROCNTRC_SendMessage
        xor     edi, edi
        VMMCall Call_Priority_VM_Event
        pop     ebx

;Eat the interrupt.  In V86 mode we don't do VMMCall Simulate_Iret
;(as is done in PM mode).

        clc
        ret

V86_I21h_Dos_Close:

;We're closing a file.  Check to see if we're closing the
;.txt file

        mov     bx, [ebp.Client_BX]
        cmp     bx, hFileHandle
        jne     SHORT V86_I21h_Exit

;The file handle matches.  Make sure it's for the right Windows task
;(which corresponds to the task's PSP)

        mov     bx, wCurPSPAddr         ;Get the current PSP addr
        cmp     bx, wFilePSPAddr    ;Same as when file was opened?
        jne     short V86_I21h_Exit     ;Nope, we're reading for a different Windows task

;We're closing the .txt file.  Reset hFileHandle and wFilePSPAddr

        xor     ax, ax
        mov     hFileHandle, ax
        mov     wFilePSPAddr, ax
        jmp     short V86_I21h_Exit

V86_I21h_Dos_Set_PSP:
        mov     ax, [ebp.Client_BX]     ;The Window's app is setting a new PSP
        mov     wCurPSPAddr, ax             ;Save its address
        jmp     short V86_I21h_Exit

V86_I21h_End_Program:
;Find the current entry in ExeIDTable and mark it available.

        mov     eax, offset32 ExeIDTable
        sub     eax, SIZE ExeID         ;point to before 1st entry
        mov     cx, 100
        mov     dx, wCurPSPAddr         ;get the current PSP

IEP_5:
        add     eax, SIZE ExeID         ;point to next entry
        cmp     [eax.idpsp_psp], dx        ;is this an available entry?
        loopne  IEP_5                   ;if no match, try the next one

        or      cx, cx                  ;did we run out of entries?
        ;Jz      ????                    ;there are no more entries

        xor     dx, dx
        mov     [eax.idpsp_psp], dx        ;set psp to zero
        int     3  ;eax points to entry

        jmp     short V86_I21h_Exit

V86_I21h_Exit:
        stc
        ret

EndProc PROCNTRC_V86_I21h_Hook, High_Free

BeginProc PROCNTRC_PM_I21h_Hook

;Chain if we're not the system VM

        cmp     ebx, SysVM
        jne     SHORT PM_I21h_Chain

;If the server DOS VM isn't running, then chain.

        mov     eax, DosVm
        or      eax, eax
        jz      SHORT PM_I21h_Chain

        mov     ax, [ebp.Client_AX]

        cmp     ax, Dos_Load_Execute_X
        je      short PM_I21h_Load_Execute
```

```
        jmp     SHORT PM_I21h_Chain

PM_I21h_Load_Execute:
        ; A Windows program has issued int 21/4b00, Load and
        ; Execute program.  Windows hooks this interrupt, since
        ; there's no way DOS can load and execute a NE program.
        ; Windows "simulates" int 21/4b00 by opening the NE
        ; executable and reading it, among other house keeping
        ; chores (getting/setting PSPs and the like).  Because
        ; Windows is handling this interrupt, it never gets
        ; reflected down into V86 mode.  However, all of the
        ; subsequent file opens and reads are reflected down
        ; to V86 mode. We set the fLoadExecute flag to TRUE
        ; so that when we see file opens and reads (in V86
        ; mode) while the flag is TRUE, we know that we're opening
        ; and reading a Windows executable program.  Why do
        ; we want to know if we're reading a Windows program?
        ; Because we want create the programs "signature" so
        ; that we can tell if the program is allowed to decrypt
        ; files.

        mov     ax, 1
        mov     fLoadExecute, ax

        ;Trace_Out "In the PM int 21 hook #eax"
        jmp     short PM_I21h_Chain

PM_I21h_Chain:
        mov     ecx, [Old_I21h_Vector_CS]
        mov     edx, [Old_I21h_Vector_EIP]
        VMMJmp  Simulate_Far_Jmp

EndProc   PROCNTRC_PM_I21h_Hook

BeginProc PROCNTRC_Dos_Open_Iret, High_Freq

        mov     ax, [ebp.Client_AX]     ;Get the file handle
        mov     hFileHandle, ax         ;Save it
        mov     ax, wCurPSPAddr            ;Get the current PSP address
        mov     wFilePSPAddr, ax        ;Save PSP addr at time file was opened
        ret

EndProc   PROCNTRC_Dos_Open_Iret

BeginProc PROCNTRC_Dos_Read_Iret, High_Freq

;This is the back end of DOS read function.  fLoadExecute
;is true.  Look at the read data and see if it's an
;executable.  If it is, then read it into our own
;data area (because we don't want to worry about
;whether or not the Windows program's data area
;is large enough) enough of the executable to
;create the "signature" needed to identify the
;program in this VxD's table.  When we're done,
;we let the VM (Windows) continue reading the
;executable.

        Client_Ptr_Flat edi, DS, DX     ;map read buffer flat
        mov     ax, OLD_MAGIC           ;old .exe magic
        cmp     ax, [edi]               ;is it an old .exe
        jz      DRI_30

;Windows is starting to load a program.  Reset fLoadExecute
;and find and entry in the ExeIDTable.

        xor     ax, ax
        mov     fLoadExecute, ax

        mov     eax, offset32 ExeIDTable
        sub     eax, SIZE ExeID         ;point to before 1st entry
        mov     cx, 100
        xor     dx, dx

DRI_5:
        add     eax, SIZE ExeID         ;point to next entry
        cmp     [eax.idpsa_psp], dx        ;is this an available entry?
        loopne  DRI_5                   ;not available, try the next one

        or      cx, cx                  ;did we run out of entries?
        ;jz      ????                    ;there are no more entries

        mov     lCurExeID, eax          ;save address of current entry

;Get the current file position (move the file pointer zero bytes
;from the current pos).  New file pos (which is the same as the
;old pos) is returned in DI/AX pair.

        movzx   ebx, [ebp.Client_BX]    ;get the file handle
        xor     ecx, ecx
        xor     edx, edx
        mov     ah, Dos_Move_File_Ptr_H
        mov     al, 1                   ;start moving from current location

        inc     wInHook                 ;prevent recursion into this hook
        VxDInt  21h                     ;do it
        dec     wInHook                 ;allow this hook to be entered

        push    edx                     ;push most significant
        push    eax                     ;push least significant

;Get the number of bytes in the file (move the file pointer zero bytes
;from the end of file).  New file pos (which is the number of bytes in
;the file) is returned in DI/AX pair.

        movzx   ebx, [ebp.Client_BX]    ;get the file handle
        xor     ecx, ecx
        xor     edx, edx
        mov     ah, Dos_Move_File_Ptr_H
        mov     al, 2                   ;start moving from end of file

        inc     wInHook                 ;prevent recursion into this hook
        VxDInt  21h                     ;do it
        dec     wInHook                 ;allow this hook to be entered

        mov     esi, lCurExeID
        mov     WORD PTR [esi.idpsa_filesize + 2], dx    ;save most significant
        mov     WORD PTR [esi.idpsa_filesize], ax               ;save least significant

;Get the file date and time

        movzx   ebx, [ebp.Client_BX]    ;get the file handle
        mov     ax, Dos_Get_File_Date_Time_I

        inc     wInHook                 ;prevent recursion into this hook
        VxDInt  21h                     ;do it
        dec     wInHook                 ;allow this hook to be entered

        mov     esi, lCurExeID
        mov     [esi.idpsa_filetime], cx
        mov     [esi.idpsa_filedate], dx

;Reset the file pointer to zero

        movzx   ebx, [ebp.Client_BX]    ;get the file handle
        xor     ecx, ecx
        xor     edx, edx
        mov     ah, Dos_Move_File_Ptr_H
        mov     al, 0                   ;start moving from beginning of file

        inc     wInHook                 ;prevent recursion into this hook
        VxDInt  21h                     ;do it
        dec     wInHook                 ;allow this hook to be entered

;Read the old EXE header into our V86 data area.

        movzx   ebx, [ebp.Client_BX]    ;get the file handle
        mov     ecx, SIZE OldExe        ;get the number of bytes
        mov     edx, pV86Data           ;get the VxD's V86 buffer
        mov     ah, Dos_Read_H

        inc     wInHook                 ;prevent recursion into this hook
        VxDInt  21h                     ;read
        dec     wInHook                 ;allow this hook to be entered

;Save the address of the new executable header

        mov     edi, pV86Data
        mov     eax, [edi.oe_lfanew]
        mov     lNewExeAddr, eax

;Move the file pointer to the new EXE header

        movzx   ebx, [ebp.Client_BX]    ;get the file handle
        mov     cx, WORD PTR [edi.oe_lfanew + 2]  ;get most significant word
        mov     dx, WORD PTR [edi.oe_lfanew]      ;get least significant word
        mov     ah, Dos_Move_File_Ptr_H
        mov     al, 0                   ;start moving from beginning of file

        inc     wInHook                 ;prevent recursion into this hook
        VxDInt  21h                     ;do it
        dec     wInHook                 ;allow this hook to be entered

;Read the new EXE header into our V86 data area.

        movzx   ebx, [ebp.Client_BX]    ;get the file handle
        mov     ecx, SIZE NewExe        ;get the number of bytes
        mov     edx, pV86Data           ;get the VxD's V86 buffer
        mov     ah, Dos_Read_H

        inc     wInHook                 ;prevent recursion into this hook
        VxDInt  21h                     ;read
        dec     wInHook                 ;allow this hook to be entered

;Make sure the magic number is there.

        mov     edi, pV86Data
        mov     ax, NEW_MAGIC           ;old .exe magic
        cmp     ax, [edi.ne_magic]      ;is it an old .exe
        jne     DRI_20                  ;error, not a new executable

;It's a new executable.  Start copying stuff into the id record.

        mov     esi, lCurExeID
        mov     eax, [edi.ne_crc]
        mov     [esi.idpsa_crc], eax
        mov     eax, [edi.ne_csip]
        mov     [esi.idpsa_csip], eax
        mov     eax, [edi.ne_sssp]
        mov     [esi.idpsa_sssp], eax
        mov     ax, [edi.ne_cpod]
```

1S/14PRINT

```
        mov     [esi.idpsp_cmod], ax

;Move the file pointer to the resident name table

        mov     eax, lNewExeAddr        ;get address of new exe header
        mov     cx, [edi.ne_restab]     ;get offset to resident name table
        movzx   ecx, cx
        add     eax, ecx

        movzx   ebx, [ebp.Client_BX]    ;get the file handle
        mov     ecx, eax                ;get the most
        shr     ecx, 16                 ;  significant word
        mov     dx, ax                  ;get the least significant word
        mov     ah, Dos_Move_File_Ptr_H
        mov     al, 0                   ;start moving from beginning of file

        inc     wInHook                 ;prevent recursion into this hook
        VxDInt  21h                     ;do it
        dec     wInHook                 ;allow this hook to be entered

;Read the length of the string

        movzx   ebx, [ebp.Client_BX]    ;get the file handle
        mov     ecx, 1                  ;get the number of bytes
        mov     edx, offset32 bCount    ;get the address of bCount
        mov     ah, Dos_Read_H

        inc     wInHook                 ;prevent recursion into this hook
        VxDInt  21h                     ;read
        dec     wInHook                 ;allow this hook to be entered

;Adjust bCount if necessary.  Clear the module field in ExeIDTable before
;reading into it.

        mov     al, bCount
        cmp     al, 12
        jle     SHORT DRI_10

        mov     al, 12
        mov     bCount, al

DRI_10:
;Clear the module field

        mov     esi, lCurExeID
        xor     eax, eax
        mov     DWORD PTR [esi.idpsp_module], eax
        mov     DWORD PTR [esi.idpsp_module + 4], eax
        mov     DWORD PTR [esi.idpsp_module + 8], eax

;Read the string

        mov     esi, lCurExeID
        movzx   ebx, [ebp.Client_BX]    ;get the file handle
        xor     ecx, ecx
        mov     cl, bCount              ;get the number of bytes
        lea     edx, [esi.idpsp_module]
        mov     ah, Dos_Read_H

        inc     wInHook                 ;prevent recursion into this hook
        VxDInt  21h                     ;read
        dec     wInHook                 ;allow this hook to be entered
        int 3
;Finally, add the current PSP to ExeIDTable

        mov     esi, lCurExeID
        mov     ax, wCurPSPAddr         ;Get the current PSP addr
        mov     [esi.idpsp_psp], ax

;At this point, the current ExeIDTable entry contains the signature
;of the program
;that Windows is reading along with the current
;PSP address.  Later, when the task tries to read a graphics file
;and the graphics file is encrypted,
;we'll get the corresponding entry in ExeIDTable
;(we'll do the lookup by PSP).  Once we have the ExeIDTable entry,
;we'll try to match the entry in the VxD's table of installed
;applications.  If we don't get a match, we'll use the
;Shell to notify the user that they are attempting to read
;an encrypted file and let the read proceed.  Hopefully, the
;task will be able to handle the unrecognizable data.  If
;there is a matching entry in the table, then we'll get the
;key from the table of applications and let the Decryption
;Server (running in its own VM) decrypted the data.

DRI_20:
;Reset the file pointer to the prior location

        movzx   ebx, [ebp.Client_BX]    ;get the file handle
        pop     edx                     ;pop least significant
        pop     ecx                     ;pop most significant
        mov     ah, Dos_Move_File_Ptr_H
        mov     al, 0                   ;start moving from beginning of file

        inc     wInHook                 ;prevent recursion into this hook
        VxDInt  21h                     ;do it
        dec     wInHook                 ;allow this hook to be entered

DRI_30:
        ret

EndProc   PROCNTRC_Dos_Read_Iret

BeginProc PROCNTRC_V86_API_Proc

        cmp     [ebp.Client_AX], NumMsgDisp
        ja      short V86_vap10

        call    DefV86MsgProc
        ret

V86_vap10:  mov     [ebp.Client_AX], ERR_UNKNOWN_MSG
        ret                                             ; exit error

EndProc PROCNTRC_V86_API_Proc

BeginProc PROCNTRC_PM_API_Proc

        cmp     [ebp.Client_AX], NumMsgDisp
        ja      short PM_vap10

        call    DefPMMsgProc
        ret

PM_vap10:  mov     [ebp.Client_AX], ERR_UNKNOWN_MSG
        ret                                             ; exit error

EndProc PROCNTRC_PM_API_Proc

; DANGER! Currently, either V86 or PM mode programs call the
; same functions, even though they enter through different
; DefxxxMsgProc functions.

DefV86MsgProc  proc

        movzx   eax, [ebp.Client_AX]            ; Get the message
        jmp     [MsgDispTable + 4 * eax]

DefV86MsgProc  endp

DefPMMsgProc  proc

        movzx   eax, [ebp.Client_AX]            ; Get the message
        jmp     [MsgDispTable + 4 * eax]

DefPMMsgProc  endp

; ENTRY:         EAX = SEG:OFF
;                EBX = VM handle
; EXIT:          EAX = offset32

V86ToPmPtr       proc

        Save    <edx>

        cmp     ebx, [SysVm]
        jne     short vtp20

; System VM, protected mode

        Save    <ecx>
        push    eax
        shr     eax, 16
        VMMcall _SelectorMapFlat <[SysVm], EAX, 0>
        pop     edx

        cmp     eax, -1
        je      short vtp10

        and     edx, 0FFFFh
        add     eax, edx
        Restore <ecx,edx>
        clc
        ret

vtp10:  Restore <ecx,edx>
        stc
        ret

; Not system VM, assume real mode

vtp20:  movzx   edx, ax
        shr     eax, 12
        and     eax, 0FFFF0h
        add     eax, edx
        add     eax, [ebx.CB_High_Linear]

        Restore <edx>
        clc
        ret

V86ToPmPtr       endp


;***********************************
;       DOS calls
;***********************************

MsgGetVer  proc
```

```
        mov     [ebe.Client_EAX], 03A0h
        ret

MsgGetVer   endp

;; ENTRY:    Client_EDI = psDosCmdBuf
; ENTRY:    Client_EDI = lpfnMsgProc

MsgRegister  proc

        mov     DosVm, ebx
        mov     eax, [ebe.Client_EDX]
        mov     lpfnMsgProc, eax

        ; We know that the current VM is the DOS VM, so
        ; translate the address of the V86 data area to
        ; a segment:offset that is meaningfull withing
        ; the current VM

        mov     eax, pV86Data
        VMMCall Map_Lin_To_VM_Addr

        shl     ecx, 16     ; move seg into high word of ecx
        mov     cx, dx      ; load offset into low word of ecx

        mov     pSegOff, ecx

        mov     [ebe.Client_EAX], ebx           ; return VM handle
        ret

MsgRegister  endp

MsgPost  proc

        ; Do we have room in the message array???
        ; NO if Write == Read-1 OR (Read == MsgArr AND Write == last element)

        mov     eax, size DosMsg
        mov     edi, MsgGet
        sub     edi, eax
        cmp     edi, MsgPut             ; Write == Read-1?
        je      short mp90                      ; YES

        lea     edx, MsgArr
        cmp     MsgGet, edx             ; Read == MsgArr?
        jne     short mp20                      ; NO
        mov     eax, MsgLast
        cmp     eax, MsgPut             ; AND Write == last
        je      short mp90

        ; OK we can store it

mp20:   mov     edi, MsgPut
        mov     ax, Msg.dMsg
        mov     [edi].dMsg, ax
        mov     ax, Msg.dwParam
        mov     [edi].dwParam, ax
        mov     eax, Msg.dlParam
        mov     [edi].dlParam, eax

        ; inc free, roll it if past end

        add     MsgPut, size DosMsg
        mov     eax, MsgLast
        cmp     MsgPut, eax
        jbe     short mp30
        lea     eax, MsgArr
        mov     MsgPut, eax

        ; Signal read we have a message

mp30:   mov     eax, MsgSem
        VMMcall Signal_Semaphore

        ; Boost the execution priority of the guy we're posting
        ; to so it gets the message ASAP.

        mov     eax, Low_Pri_Device_Boost
        mov     ebx, DosVm
        VMMcall Adjust_Exec_Priority

mp40:   mov     eax, ERR_NONE
        ret

mp90:   mov     eax, ERR_MSG_FULL
        ret

MsgPost  endp

; ENTRY:        AX = MSG_PEEK
;               EDX = pMsg
; EXIT:         AX = uErr
MsgPeek  proc

        ; do we have one?

        mov     edi, MsgGet
        cmp     edi, MsgPut
        je      short mpk90

        ; Lets fill it in

        mov     eax, [ebe].Client_EDI
        call    V86ToPmPtr
        mov     esi, edi
        mov     edi, eax
        mov     ecx, (size DosMsg) / 2
        rep     movsw

        mov     [ebe.Client_EAX], ERR_NONE
        ret

mpk90:  VMMcall Release_Time_Slice
        mov     [ebp.Client_EAX], ERR_NO_MSG
        ret

MsgPeek  endp

MsgRead  proc

        ; Lets block if there are no messages

        mov     eax, MsgSem
        mov     ecx, Block_Svc_Ints or Block_Enable_Ints
        VMMcall Wait_Semaphore

        ; Lets fill it in

mr10:   mov     eax, [ebp].Client_EDX
        call    V86ToPmPtr
        mov     esi, MsgGet
        mov     edi, eax
        mov     ecx, (size DosMsg) / 2
        rep     movsw

        ; inc next, roll it if past end

        add     MsgGet, size DosMsg
        mov     eax, MsgLast
        cmp     MsgGet, eax
        jbe     short mr20
        lea     eax, MsgArr
        mov     MsgGet, eax

mr20:   mov     [ebp.Client_EAX], ERR_NONE
        ret

MsgRead  endp

MsgDone proc

; Signal the semaphore, letting the int 21 hook return to the
; calling Windows program

        ;mov     eax, VxdSem
        ;VMMcall Signal_Semaphore

        mov     ebx, SysVm
        VMMcall  Wake_Up_VM

        ret

MsgDone  endp


MsgSuspend proc

        mov     ax, 1
        mov     [ebp.Client_AX], ax    ; set the return code
        VMMcall Release_Time_Slice

        ret

MsgSuspend  endp

MsgHookInt21h proc

; Hook the I21 PM chain

        mov     eax, 21h
        VMMCall Get_PM_Int_Vector
        mov     [Old_I21h_Vector_CS], ecx
        mov     [Old_I21h_Vector_EIP], edx

        mov     esi, OFFSET32 PROCNTRC_PM_I21h_Hook
        VMMCall Allocate_PM_Call_Back

        movzx   edx, ax
        mov     ecx, eax
        shr     ecx, 16
        mov     eax, 21h
        VMMCall Set_PM_Int_Vector

        ret

MsgHookInt21h  endp


;*************************************************************************
;
```

```
;    PROCNTRC_SendMessage
;
;       Called by the priority VM event dispatch routine of VMM.
;
;    ENTRY:
;       EBX: The DOS server VM handle
;       EBP: Client register structure
;       EDX: Flat address of Msg
;
;    USES:
;       EAX, EDX, FLAGS
;
;****************************************************************************

BeginProc PROCNTRC_SendMessage

        Trace_Out "In PROCNTRC_SendMessage"

        Push_Client_State
        VMMCall Begin_Nest_Exec

        mov     ax, Msg.dMsg                           ; notification msg
        VMMCall Simulate_Push
        mov     ax, Msg.dwParam
        VMMCall Simulate_Push                          ; wParam
        mov     ax, WORD PTR [Msg.dlParam + 2]
        VMMCall Simulate_Push                          ; lParam is ref data
        mov     ax, WORD PTR [Msg.dlParam]
        VMMCall Simulate_Push

        movzx   edx, WORD PTR [lpfnMsgProc]            ; IP (EIP)
        mov     cx, WORD PTR [lpfnMsgProc + 2]         ; CS

        VMMCall Simulate_Far_Call                      ; call MsgProc
        VMMCall Resume_Exec
        VMMCall End_Nest_Exec
        Pop_Client_State

        mov     cx, Msg.dwParam
        movzx   ecx, cx
        mov     esi, pV86Data           ;source
        mov     edi, pPMData            ;dest
        cld
        rep     movsb


        ret

EndProc PROCNTRC_SendMessage

;****************************************************************************
;
;    PROCNTRC_PostMessage
;
;       Called by the priority VM event dispatch routine of VMM.
;
;    ENTRY:
;       EBX: The system VM handle
;       EBP: Client register structure
;       EDX: Reference data
;
;    USES:
;       EAX, EDX, FLAGS
;
;****************************************************************************

BeginProc PROCNTRC_PostMessage

        Trace_Out "In PROCNTRC_PostMessage"

        ret

EndProc PROCNTRC_PostMessage


VxD_LOCKED_CODE_ENDS

END


;----------------------------------------------------------------------------
;  End of File: procntrc.asm
;----------------------------------------------------------------------------
```

```
PROCNTRC_Device_ID      equ     1234h   ; Temporary ID

VER_NUM                 EQU             0110h
OLD_MAGIC               EQU             5A4Dh
NEW_MAGIC               EQU             454Eh
KEYLENGTH               EQU  8
TAGLENGTH               EQU  8
MAXCUST                 EQU  100
; Also set in win_link.h

; Messages to Windows

; Messages to Win-Link
MSG_WIN_IPC             EQU             678Ah

MSG_WIN_EXEC            EQU             6789h
MSG_PRINT_NEW           EQU             678Bh
MSG_PRINT_OFF           EQU             678Ch
MSG_PRINT_FILE          EQU             678Dh
MSG_PRINT_CHAR          EQU             678Eh
MSG_PRINT_FILE_BLK      EQU             678Fh
MSG_PRINT_FILE_DNE      EQU             6790h
MSG_PRINT_PSP           EQU             6791h
MSG_PRINT_CHAR_DNE      EQU             6792h
MSG_PRINT_CHAR_DESTROY  EQU             6793h
MSG_DOS_EXEC            EQU             6794h
MSG_DOS_TITLE           EQU             6795h

; Services in Win-IPC
MSG_GET_VER             EQU             0
MSG_REGISTER            EQU             1
MSG_POST                EQU             2
MSG_PEEK                EQU             3
MSG_READ                EQU             4
MSG_DONE                EQU             5
MSG_SUSPEND             EQU             6
MSG_HOOKINT21H          EQU             7

MSG_DOS_MAX             EQU             7

; SysFlags
; also do in win_link.h
EXEC_OFF                EQU             0001h
PRINT_OFF               EQU             0002h
NO_IGNORE               EQU             0004h
MEM_OFF                 EQU             0008h
IPC_OFF                 EQU             0010h
TITLE_OFF               EQU             0020h

; VmData.wFlags
I24_ON                  EQU             0040h
TITLE_SET               EQU             0080h

NUM_DATA_STRUC          EQU             40
NUM_MSG_STRUC           EQU             20
SIZE_PRNT_BLOCK         EQU             1022
SIZE_PRNT_BUF           EQU             3076

FLAG_SEND_MSG           EQU             00010000h
FLAG_HI_PRI             EQU             00020000h

; int 17h return codes
PRN_OK                  EQU             90h
;PRN_BUSY               EQU             18h
PRN_BUSY                EQU             09h
PRN_ERR                 EQU             09h

; errors from VXD

ERR_NONE                EQU             0
ERR_UNKNOWN_VM          EQU             1
ERR_UNKNOWN_ID          EQU             2
ERR_SEND_FAILED         EQU             3       ; can't send - try again
ERR_MSG_FULL            EQU             4
ERR_VM_FULL             EQU             5
ERR_UNKNOWN_MSG         EQU             6
ERR_POST_FAILED         EQU             7       ; post/send failed
ERR_UNKNOWN_ERR         EQU             8
ERR_NO_VXD              EQU             9
ERR_NO_SEMAPHORE        EQU             10
ERR_NO_WIN_APP          EQU             11
ERR_DUP_WIN_APP         EQU             12
ERR_WIN_TO_WIN          EQU             13
ERR_UNREGISTER_OTHER    EQU             14
ERR_NO_VM_MEMORY        EQU             15
ERR_NO_MSG              EQU             16
ERR_BAD_SELECTOR        EQU             17

; struc for holding DOS box messages
MAX_DOS_MSG             EQU             32
DosMsg  struc
        dMsg            dw      ?
        dwParam         dw      ?
        dlParam         dd      ?
DosMsg  ends

; structure for executable "signature"
EXEPSP  struc
        idpsp_crc       dd      0               ; 32 bit checksum
        idpsp_csip      dd      0               ; Initial CS:IP
        idpsp_sssp      dd      0               ; Initial SS:SP
        idpsp_filesize  dd      0               ; File size
        idpsp_cmod      dw      0               ; Entries in module reference table
        idpsp_filedate  dw      0               ; File date
        idpsp_filetime  dw      0               ; File time
        idpsp_module    db      12 dup (0)      ; Module name

; ======= Following not installed into VxD by UINSTALL ========

        idpsp_psp       dw      0               ; PSP of task which is loading executable
EXEPSP  ends

EXEID   struc
        id_crc          dd      0               ; 32 bit checksum
        id_csip         dd      0               ; Initial CS:IP
        id_sssp         dd      0               ; Initial SS:SP
        id_filesize     dd      0               ; File size
        id_cmod         dw      0               ; Entries in module reference table
        id_filedate     dw      0               ; File date
        id_filetime     dw      0               ; File time
        id_module       db      12 dup (0)      ; Module name
EXEID   ends

KEYTABLE struc
        abCustomer      db  "future"
                        db  TAGLENGTH - ($ - abCustomer) dup (0)
        abEncryptedKey  db  KEYLENGTH + (SIZE EXEID) * 4 dup (0)
KEYTABLE ends

OldExe struc
        oe_magic        dw      ?               ; Magic number
        oe_cblp         dw      ?               ; Bytes on last page of file
        oe_cp           dw      ?               ; Pages in file
        oe_crlc         dw      ?               ; Relocations
        oe_cparhdr      dw      ?               ; Size of header in paragraphs
        oe_minalloc     dw      ?               ; Minimum extra paragraphs needed
        oe_maxalloc     dw      ?               ; Maximum extra paragraphs needed
        oe_ss           dw      ?               ; Initial (relative) SS value
        oe_sp           dw      ?               ; Initial SP value
        oe_csum         dw      ?               ; Checksum
        oe_ip           dw      ?               ; Initial IP value
        oe_cs           dw      ?               ; Initial (relative) CS value
        oe_lfarlc       dw      ?               ; File address of relocation table
        oe_ovno         dw      ?               ; Overlay number
        oe_res          dw      4 dup (?)       ; Reserved words
        oe_oemid        dw      ?               ; OEM identifier (for oeminfo)
        oe_oeminfo      dw      ?               ; OEM information oemid specific
        oe_res2         dw      10 dup (?)      ; Reserved words
        oe_lfanew       dd      ?               ; File address of new exe header
OldExe ends

NewExe struc
        ne_magic        dw      ?               ; Magic number NE_MAGIC
        ne_ver          db      ?               ; Version number
        ne_rev          db      ?               ; Revision number
        ne_enttab       dw      ?               ; Offset of Entry Table
        ne_cbenttab     dw      ?               ; Number of bytes in Entry Table
        ne_crc          dd      ?               ; Checksum of whole file
        ne_flags        dw      ?               ; Flag word
        ne_autodata     dw      ?               ; Automatic data segment number
        ne_heap         dw      ?               ; Initial heap allocation
        ne_stack        dw      ?               ; Initial stack allocation
        ne_csip         dd      ?               ; Initial CS:IP setting
        ne_sssp         dd      ?               ; Initial SS:SP setting
        ne_cseg         dw      ?               ; Count of file segments
        ne_cmod         dw      ?               ; Entries in Module Reference Table
        ne_cbnrestab    dw      ?               ; Size of non-resident name table
        ne_segtab       dw      ?               ; Offset of Segment Table
        ne_rsrctab      dw      ?               ; Offset of Resource Table
        ne_restab       dw      ?               ; Offset of resident name table
        ne_modtab       dw      ?               ; Offset of Module Reference Table
        ne_imptab       dw      ?               ; Offset of Imported Names Table
        ne_nrestab      dd      ?               ; Offset of Non-resident Names Table
        ne_cmovent      dw      ?               ; Count of movable entries
        ne_align        dw      ?               ; Segment alignment shift count
        ne_cres         dw      ?               ; Count of resource entries
        ne_exetyp       db      ?               ; Target operating system
        ne_res          db      9 dup (?)       ; Pad structure to 64 bytes
NewExe ends

VmMsg   struc
        Handle          dd      0               ; Vm Handle to send/post to
        lParam1         dd      ?               ; EAX
        lParam2         dd      ?               ; EDX
        lWndMsg         dd      ?               ; ECX
        VmOff           dd      ?               ; offset to VmData
        SendSem         dd      ?               ; Semaphore (if send)
        Rtn             dd      ?               ; Rtn value
VmMsg   ends
.errnz (size VmMsg) and 3
```

```
; Windows message
VIDMSG  struc
        mHnd            dw      ?
        mMsg            dw      ?
        mwParam         dw      ?
        mFlags          dw      ?
        mlParam         dd      ?
        mEDI            dd      ?
        inUse           dw      0
VIDMSG  ends


; EAX: uMsg = Message to post to Win-IPC
; ECX: lParam1 = first long param
; EDI: lParam2 = second long param
CallVxd MACRO   uMsg, lParam1, lParam2
local   a
        cmp     [WinIpcAddr], 0
        je      short a

        mov     ecx, lParam1
        mov     edx, lParam2
        mov     eax, uMsg
        xor     ebx, ebx

        call    dword ptr [WinIpcAddr]
a:
        ENDM


PostPm MACRO    lVm,hWnd,uMsg,wParam,lParam
        mov     eax, lVm
        mov     [ebp.Client_EBX], eax
        mov     ax, uMsg
        shl     eax, 16
        mov     ax, hWnd
        mov     [ebp.Client_ECX], eax
        mov     eax, 0
        mov     ax, wParam
        mov     [ebp.Client_EAX], eax
        mov     eax, lParam
        mov     [ebp.Client_EDX], eax
        call    LinkMsgProc
        ENDM

SendPm MACRO    lVm,hWnd,uMsg,wParam,lParam
        mov     eax, lVm
        mov     [ebp.Client_EBX], eax
        mov     ax, uMsg
        shl     eax, 16
        mov     ax, hWnd
        mov     [ebp.Client_ECX], eax
        mov     eax, FLAG_SEND_MSG
        mov     ax, wParam
        mov     [ebp.Client_EAX], eax
        mov     eax, lParam
        mov     [ebp.Client_EDX], eax
        call    LinkMsgProc
        ENDM


Save    MACRO   reg

        irp     r, <reg>
        push    r
        endm

        ENDM

Restore MACRO   reg

        irp     r, <reg>
        pop     r
        endm

        ENDM
```

```
/* encrypt.c */

/* Author: Michael B. Cole */
/* Date:  June 25, 1994 */
/* change log*/
/*  WHO          WHEN          WHAT    */
/*  MBC          06/25/94      Initial Version */


#include "encrypt.h"


typedef struct _FILENAME
  {
    char     szFileName[55];
  } FILENAME;

typedef FILENAME *PFILENAME;


BYTE  abKey [KEYLENGTH];
BYTE  abTempbuffer [KEYLENGTH];
BYTE  abInbuffer [BUFFER];
short sOriginalLength;
short extract_key (BYTE *);
void  init_banner (PBANNER *);
char  achFormat[80];
char     c, szOutFile[255], szBackupFile[255], szBuffer[255];
PFILENAME   pFileName, pFileNameHead;
char     szDrive[3], szDir[20], szFileName[55], szExt[4];
int    i;
struct _find_t  c_file;

void  encrypt_file ();


void main (int iNumber_of_params, char *pchParams[])
{
    printf ("Encrypt Version 1.0\n\n");

    if (iNumber_of_params == 1)
      {
      Usage ();
      exit (1);
    }


    if (iNumber_of_params != 2)
    {
      perror ("wrong number of parameters\n");
      Usage ();
      exit (1);
    }

  pFileNameHead = (PFILENAME) malloc (sizeof (FILENAME) * 400);
  pFileName     = pFileNameHead;

  _splitpath (pchParams[1], szDrive, szDir, szFileName, szExt);

  if (strchr (szExt, '*') || strchr (szExt, '?'))
      {
          perror ("Sorry, wild characters are not allowed in the file extension.\n"
               "You dont want to blanket encrypt\n");
          exit (1);
      }


   /* Find first in request */

  if (_dos_findfirst( pchParams[1], _A_NORMAL, &c_file ))
      {
        perror ("No files found\n");
         exit (1);
    }

  do
    {
        strcpy (szBuffer, szDrive);
        strcat (szBuffer, szDir);
          strcat (szBuffer, c_file.name);

          hfFile1 = _open( szBuffer, _O_RDONLY | _O_BINARY );

      if( hfFile1 == -1 )
          {
            sprintf (achFormat, "open failed on %s",  szBuffer);
          perror( achFormat );
          exit (1);
        }

      printf ("\nEncrypting %s\n", szBuffer);

        strcpy (pFileName->szFileName, c_file.name);
          pFileName++;

                /* Copy to szOutFile the input file name up to and including
              the "." */

      for (i = 0; (c = c_file.name[i]) && (c != '.'); i++)
          szOutFile[i] = toupper (c);

      szOutFile[i++] = '.';
          szOutFile[i] = '\0';

          /* Complete the output file name */

      strcat (szOutFile, "$$$");

      strcpy (szBuffer, szDrive);
          strcat (szBuffer, szDir);
      strcat (szBuffer, szOutFile);

      hfFile2 = _open( szOutFile, _O_WRONLY | _O_CREAT | _O_BINARY | _O_TRUNC,
             _S_IREAD | _S_IWRITE );

      if( hfFile2 == -1 )
          {
            sprintf (achFormat, "open failed on %s",  pchParams[2]);
          perror( achFormat );
        }


            encrypt_file ();

          _close (hfFile1);
      _close (hfFile2);
      }
    while (_dos_findnext (&c_file)  == 0);

  /* rename files to get rid of .$$$ and create .bak */

    pFileName->szFileName[0] = '\0';

    for (pFileName = pFileNameHead; pFileName->szFileName[0]; pFileName++)
      {
      /* Copy to szOutFile the input file name up to and including
          the '.' */

        for (i = 0; (c = pFileName->szFileName[i]) && (c != '.'); i++)
            szOutFile[i] = toupper (c);

        szOutFile[i++] = '.';
          szOutFile[i] = '\0';

        /* Create the backup file name */

        strcpy (szBackupFile, szDrive);
          strcat (szBackupFile, szDir);
          strcat (szBackupFile, szOutFile);
          strcat (szBackupFile, "BAK");

          unlink (szBackupFile);

          strcpy (szBuffer, szDrive);
          strcat (szBuffer, szDir);
          strcat (szBuffer, szOutFile);
          strcat (szBuffer, "$$$");

        /* Complete the output file name */

          strcpy (szOutFile, szDrive);
          strcat (szOutFile, szDir);
          strcat (szOutFile, pFileName->szFileName);

          rename (szOutFile, szBackupFile);
          rename (szBuffer,  szOutFile);
      } /* end for */

  free (pFileNameHead);

    printf ("\nProcess done\n");
}





short extract_key (NPB npbKey)
{
  BYTE bTest;
  BYTE abData [KEYLENGTH] =
  {
    0x0a,
    0x0b,
    0xff,
    0xdd,
    0x87,
    0x55,
    0x76,
    0xcf,
  };

  abData [0] = bPhonyKeyPart1;
  abData [1] = bPhonyKeyPart2;
  abData [2] = bPhonyKeyPart3;
  abData [3] = bPhonyKeyPart4;
  abData [4] = bPhonyKeyPart5;

  memcpy (npbKey, abData, KEYLENGTH);

```

```
  bTest = bRealKeyPart1 >> 4;

  switch (bTest)
  {
    case 0x01:
      abData [0] = bRealKeyPart1;
      abData [1] = bRealKeyPart2;
      abData [2] = bRealKeyPart3;
      abData [3] = bRealKeyPart4;
      abData [4] = bRealKeyPart5;
      case 0x02:
      abData [4] = bRealKeyPart1;
      abData [3] = bRealKeyPart2;
      abData [2] = bRealKeyPart3;
      abData [1] = bRealKeyPart4;
      abData [0] = bRealKeyPart5;
    default:
      abData [4] = bRealKeyPart1;
      abData [1] = bRealKeyPart2;
      abData [2] = bRealKeyPart3;
      abData [3] = bRealKeyPart4;
      abData [0] = bRealKeyPart5;
  }

  abData [5] = '\0';
  abData [6] = '\0';
  abData [7] = '\0';


  memcpy (rabKey, abData, KEYLENGTH);
  return 0;
}
void init_banner (PBANNER pbnrTemp)
{

  strcpy (pbnrTemp->achLogo, "PROCENTRICBITBLOCKERtm");
  strcpy (pbnrTemp->achVer, "Ver1.0");
  strcpy (pbnrTemp->achCustomer, "MBC0001");
  return;
}


void Usage ()
{
  printf ("Usage: encrypt FILEPATH\n");
  printf ("\nThe filespec you give Encrypt will be encrypted.\n\n");
  printf ("During operation Encrypt will read your files in\n");
  printf ("and write out encrpted files with the extension .$$$\n\n");
  printf ("If Encrypt completes sucessfully, your original files \n");
  printf ("will be renamed with a .BAK extension.\n\n");
  printf ("The encrypted files will be renamed from .$$$ to \n");
  printf ("your original extension.\n");
}


void encrypt_file ()
{
    /* PREINSTL.EXE uses a CRC method to install its key.
      if these dont check out someone messed with ENCRYPT.EXE */

    if (sReturn = extract_key (abKey))
      {
        perror ("Ive been messed with\n");
        exit (1);
      }

  /* if set to END we are encrypting */
  abKey [5] = '\0';
  abKey [6] = '\0';
  abKey [7] = '\0';


  deskey (abKey, END);




    /* passed all obvious errors now we proceed */

    /* Get the time to determine the lengths of the run-length headers */
    time (&tTime);
  tmLocalTime = localtime (&tTime);

  { short sRemainder;
  /* length must be multiple of encrypt length */
  sRemainder = tmLocalTime->tm_sec % KEYLENGTH;
  tmLocalTime->tm_sec -= sRemainder;
  }

  phdrTemp.asHdr [0] = 3;
  phdrTemp.asHdr [1] = 2;
  phdrTemp.sBlocklen = BUFFER - tmLocalTime->tm_sec;
  phdrTemp.sRandom = tmLocalTime->tm_sec;
  phdrTemp.sRemainder = 0;

  sOriginalLength = phdrTemp.sBlocklen;



    /* encrypt run-length header */
    /* pretty silly since they will all look the same in the
      cipher-text - just smoke and mirrors for the hacker */


  phdrOut.asHdr [0]    = phdrTemp.asHdr [0]  ^ asPhdrKey [0];
  phdrOut.asHdr [1]    = phdrTemp.asHdr [1]  ^ asPhdrKey [1];
  phdrOut.sBlocklen    = phdrTemp.sBlocklen  ^ asPhdrKey [2];
  phdrOut.sRandom    = phdrTemp.sRandom  ^ asPhdrKey [3];
  phdrOut.sRemainder = 0;

  /* write out one time banner */

  init_banner (&pbnrBanner);

  if ( (sNum = write (hfFile2, &pbnrBanner, sizeof(PBANNER) ) == -1) )
    {
        sprintf (achFormat, "error writing file %s",  szOutFile);
      perror( achFormat );
      exit (1);
    }


  while (sLength = read (hfFile1, abInbuffer, phdrTemp.sBlocklen) )
    {

  /* the run-length describes the length of the data to follow */
  /* that length will never exceed what is left in the buffer */

      if (sLength < phdrTemp.sBlocklen)
        {
          { short sRemainder;
        /* force length to ber a multiple of encrypt length */
          sRemainder = sLength % KEYLENGTH;
          sLength += KEYLENGTH - sRemainder;
          phdrTemp.sRemainder = KEYLENGTH - sRemainder;
          }

          phdrTemp.sBlocklen  = sLength;
          phdrTemp.sRandom  = BUFFER - sLength;
          /* mark as last block */
          phdrTemp.asHdr [0]  = 4;
          phdrOut.asHdr [0]   = phdrTemp.asHdr [0]  ^ asPhdrKey [0];
          phdrOut.asHdr [1]   = phdrTemp.asHdr [1]  ^ asPhdrKey [1];
          phdrOut.sBlocklen   = phdrTemp.sBlocklen  ^ asPhdrKey [2];
          phdrOut.sRandom   = phdrTemp.sRandom  ^ asPhdrKey [3];
          phdrOut.sRemainder  =   phdrTemp.sRemainder;
            }

          if ( (sNum = write (hfFile2, &phdrOut, sizeof(PHEADER) ) == -1) )
        {
            sprintf (achFormat, "error writing file %s",  szOutFile);
          perror( achFormat );
          exit (1);
        }




      for (npbBuffer = abInbuffer;
          npbBuffer < abInbuffer  + phdrTemp.sBlocklen;
          npbBuffer += KEYLENGTH)
        {
          des (npbBuffer , abTempbuffer);
          memcpy (npbBuffer, abTempbuffer, KEYLENGTH);
        }

      printf ("\r|");
      printf ("\r/");
      printf ("\r-");
      printf ("\r\\");



      if ( (sNum = write (hfFile2, abInbuffer, sOriginalLength) ) == -1)
        {
            sprintf (achFormat, "error writing file %s",  szOutFile);
          perror( achFormat );
          exit (1);
        }
    } /* end while */
}
```

```
/* random number generation to produce 40-bit key */
/* keygen.c */

/* Author: Michael B. Cole */
/* Date:  June 25, 1994 */
/* change log*/
/*  WHO           WHEN          WHAT    */
/*  MBC           06/25/94      Initial Version */

#include "bitblock.h"

#include <stdlib.h>
#include <stdio.h>
#include <time.h>

#define LOWORD(l)             ((unsigned short)(unsigned long)(l))
#define HIWORD(l)             ((unsigned short)((((unsigned long)(l)) >> 16) & 0xFFFF))

char  achKey[6];
HFILE hfFile;
char  achFormat [80];

void Usage (void);

void main (int iNumber_of_params, char *pchParams[])
{
  int i;
  time_t lTime;

    if (iNumber_of_params == 1)
      {
      Usage ();
      exit (0);
    }


    hfFile = _open( pchParams[1], _O_WRONLY | _O_CREAT | _O_BINARY | _O_TRUNC,
              _S_IREAD | _S_IWRITE );

  if( hfFile == -1 )
      {
        sprintf (achFormat, "open failed on %s",  pchParams[1]);
      perror( achFormat );
      return;
    }


   /* Seed the random-number generator with current time so that
    * the numbers will be different every time we run.
    */
   lTime = time( NULL );
   srand( LOWORD (lTime) ^ HIWORD (lTime)  );

   /* Display 10 numbers. */
   for( i = 0; i < 5; i++ )
       achKey [i] =  (unsigned char) rand() % 255;

  achKey [5] = '\0';

  printf ("key = %s\n", achKey);

  if ( (i = write (hfFile, achKey,6 )) == -1)
    {
     perror  ("Error writing file\n");
     return;
    }

  _close (hfFile);

}



void Usage ()
{
  printf ("Usage: keygen FILEOUT\n");

}
```

```
/* preinstl.c */

/* Author: Michael B. Cole */
/* Date:  June 29, 1994 */
/* change log*/
/*  WHO        WHEN        WHAT    */
/*  MBC        04/29/94    Initial Version */


#include "bitblock.h"
#include "newexe.h"
#include <stdlib.h>
#include <dums.h>

#define TRUE 1
#define FALSE 0
#define LOWORD(l)            ((unsigned short)(unsigned long)(l))
#define HIWORD(l)            ((unsigned short)((((unsigned long)(l)) >> 16) & 0xFFFF))


HFILE hfKeyFile;
HFILE hfInFile;
HFILE hfOutFile;
HFILE   hfCustFile;
HFILE hfExeFile;
short sLength;
BYTE  abKey[KEYLENGTH];
BYTE  abCust[TAGLENGTH];
BYTE    abInbuffer[BUFFER + TAGLENGTH + sizeof (EXEID) + sizeof(EXEID)];
BYTE  *npbIn;
short sNum;
BYTE  abAltKey[KEYLENGTH] =   {0xaa,
                0xbb,
                0xc1,
                0x12,
                0x33,
                0x34,
                0x45,
                0x22};

char        achFormat[80];
struct        exe_hdr  OldHeader;            /* DOS 1, 2, 3 .EXE header */
struct        new_exe  NewHeader;            /* New .EXE header */
EXEID       ExeId;
NPB         npbExe;
BYTE        abLoseCust [TAGLENGTH] = "1457hkk";

struct        _stat statbuf;            /* structure to hold exe files stats */

BYTE        abRandom [sizeof (EXEID)];


void main (int iNumber_of_params, char *pchParams[])
{
  int        i;
  int        iChanges = 0;
  int        fFirstWrite;
  unsigned char   count;
  time_t lTime;
  NPB        npbRandom, npbCust1, npbCust2;


    if (iNumber_of_params == 1)
      {
      Usage ();
      exit (1);
    }


    if (iNumber_of_params != 6)
    {
      perror ("wrong number of parameters\n");
      Usage ();
      return;
    }


  hfKeyFile = _open( pchParams[1], _O_RDONLY | _O_BINARY );

  if( hfKeyFile == -1 )
      {
        sprintf (achFormat, "open failed on %s",  pchParams[1]);
      perror( achFormat );
      return;
    }


    hfInFile = _open( pchParams[2], _O_RDONLY | _O_BINARY );

  if( hfInFile == -1 )
      {
        sprintf (achFormat, "open failed on %s",  pchParams[2]);
      perror( achFormat );
      return;
    }

  hfOutFile = _open( pchParams[3], _O_RDWR | _O_CREAT | _O_BINARY | _O_TRUNC,
            _S_IREAD | _S_IWRITE );

  if( hfOutFile == -1 )
      {
        sprintf (achFormat, "open failed on %s",  pchParams[3]);
      perror( achFormat );
      return;
    }


   hfCustFile = _open( pchParams[4], _O_RDONLY | _O_BINARY );

 if( hfCustFile == -1 )
      {
        sprintf (achFormat, "open failed on %s",  pchParams[4]);
      perror( achFormat );
      return;
    }


    if ( (sLength = read (hfCustFile, &abCust, TAGLENGTH) ) < sizeof(TAGLENGTH) )
    {
      abCust [TAGLENGTH] = '\0';
        sprintf (achFormat, "bad cust number %s",  abCust);
      perror( achFormat );
      return;
    }

    abCust [TAGLENGTH - 1] = '\0';

    /* Seed the random-number generator with current time so that
    * the numbers will be different every time we run.
    */
   lTime = time( NULL );
   srand( LOWORD (lTime) ^ HIWORD (lTime)  );

   for( i = 0; i < sizeof (EXEID); i++ )
       abRandom [i] =  (unsigned char) rand() % 255;


  /* grab header info from exe they'll be using with bitblocker */


    hfExeFile = _open( pchParams[5], _O_RDONLY | _O_BINARY );

    if( hfExeFile == -1 )
      {
        sprintf (achFormat, "open failed on %s",  pchParams[5]);
      perror( achFormat );
      return;
    }



    /* Read the old header. */
    if (sLength = read (hfExeFile, &OldHeader, sizeof(OldHeader))  != sizeof(OldHeader))
    {
        perror ( "Bad exe file error 01");
      return;
    }


    /* Check it. */
    if (OldHeader.e_magic != EMAGIC)
      {
      perror ( "Bad exe file error 02");
      return;
      }

    /* Seek to the new header. */
    if (_lseek(hfExeFile, OldHeader.e_lfanew, SEEK_SET) != OldHeader.e_lfanew)
      {
      perror ( "Bad exe file error 03");
      return;
      }

    /* Read the new header. */
    if (sLength = read(hfExeFile, &NewHeader, sizeof(NewHeader)) != sizeof(NewHeader))
      {
      perror ( "Bad exe file error 04");
      return;
      }

    /* Check it. */
    if (NewHeader.ne_magic != NEMAGIC)
      {
      perror( "Bad exe file error 05");
      return;
      }

    memset (&ExeId, 0, sizeof (EXEID));

    ExeId.ne_crc  = NewHeader.ne_crc;
    ExeId.ne_csip = NewHeader.ne_csip;
    ExeId.ne_sssp = NewHeader.ne_sssp;
    ExeId.ne_cmod = NewHeader.ne_cmod;


    /* Seek to themodule name count and string. */
    if (_lseek(hfExeFile,  OldHeader.e_lfanew + NewHeader.ne_restab, SEEK_SET) == -1)
          {
      perror( "Bad exe file error 06");
      return;
```

```
      }

   /* Read the count. */
   if (sLength = read(hfExeFile, &count, sizeof(count)) != sizeof(count))
      {
      perror( "Bad exe file error 07");
      return;
      }

   if (count > 12)
     count = 12;

   /* Read the description. */
   if (sLength = read(hfExeFile, ExeId.achModule_name, count) != count)
      {
      perror("Bad exe file error 08" );
      return;
      }


   if (_fstat( hfExeFile, &statbuf ) == -1)
     {
      perror("Bad exe file error 09" );
      return;
      }

   ExeId.st_size  = statbuf.st_size;

   _asm
     {
        mov   bx, hfExeFile     ;file handle
        mov   ax, 5700h         ;get file date and time
        int   21h
        mov   ExeId.ne_filetime, cx
        mov   ExeId.ne_filedate, dx
     }

   dump16 (&ExeId, 33);

   /* exe header file end */

   /* hide the exeid info */

   for (npbRandom = abRandom, npbExe = (BYTE *) &ExeId;
     npbRandom < abRandom + sizeof (abRandom);
      npbExe++, npbRandom++)
     *npbExe ^= *npbRandom;


   fFirstWrite = TRUE;


   if ( (sLength = read (hfKeyFile, &abKey, KEYLENGTH) ) < sizeof(KEYLENGTH) )
   {
     abKey [KEYLENGTH] = '\0';
       sprintf (achFormat, "key must be 5 bytes %s",  abKey);
     perror( achFormat );
     return;
   }

  abKey [5] = '\0';
  abKey [6] = '\0';
  abKey [7] = '\0';

  abAltKey[1] ^= abKey[1];
  abAltKey[2] ^= abKey[2];
  abAltKey[3] ^= abKey[3];
  abAltKey[4] ^= abKey[4];
  abAltKey[5] ^= abKey[5];
  abAltKey[6] ^= abKey[6];
  abAltKey[7] ^= abKey[7];
  abAltKey[0] ^= abKey[0];

  for (i = 0; i < TAGLENGTH + sizeof(EXEID) + sizeof(EXEID) ; i++)
    abInbuffer[i] = '\0';



  while (sLength = read (hfInFile, abInbuffer + TAGLENGTH + sizeof (EXEID) + sizeof(EXEID), BUFFER) )
    {
      /* go through every byte in the buffer */

      for (npbIn = abInbuffer;
            npbIn < abInbuffer + sLength - (fFirstWrite ? TAGLENGTH + sizeof (EXEID) + sizeof (EXEID) : 0);
            npbIn++)
        {
          /* test to see if next TAGLENGTH bytes
             contains a string */


          if (!npbIn[TAGLENGTH - 1])
            {
              if (!strcmp (npbIn, "SEC0001"))
                {
                  npbCust1 = abCust;
                  npbCust2 = abLoseCust;

                  while (npbCust1 < abCust + TAGLENGTH)
                    *npbCust1++ ^= *npbCust2++;

                  memcpy (npbIn, abCust, TAGLENGTH);
                  memcpy (npbIn + TAGLENGTH, &ExeId, sizeof (EXEID));
                  memcpy (npbIn + TAGLENGTH + sizeof (EXEID), abRandom, sizeof (abRandom));
                  iChanges++;
                }
                else
              if (!strcmp (npbIn, "ERR0001"))
                {
                  *(npbIn + TAGLENGTH) = abKey [0];
                  iChanges++;
                }

              else
              if (!strcmp (npbIn, "ERR0002"))
                {
                  *(npbIn + TAGLENGTH) = abKey [0];
                  iChanges++;
                }

              else
              if (!strcmp (npbIn, "ERR0003"))
                {
                  *(npbIn + TAGLENGTH) = abKey [1];
                  iChanges++;
                }
              else
            if (!strcmp (npbIn, "ERR0004"))
              {
                  *(npbIn + TAGLENGTH) = abKey [2];
                  iChanges++;
                }
              else
              if (!strcmp (npbIn, "ERR0005"))
                {
                  *(npbIn + TAGLENGTH) = abKey [1];
                  iChanges++;
                }
              else
              if (!strcmp (npbIn, "ERR0006"))
                {
                  *(npbIn + TAGLENGTH) = abKey [3];
                  iChanges++;
                }
              else
              if (!strcmp (npbIn, "ERR0007"))
                {
                  *(npbIn + TAGLENGTH) = abKey [4];
                  iChanges++;
                }
                else
              if (!strcmp (npbIn, "ERR0008"))
                {
                  *(npbIn + TAGLENGTH) = abKey [2];
                  iChanges++;
                }
              else
            if (!strcmp (npbIn, "ERR0009"))
                *(npbIn + TAGLENGTH) = abKey [3];
              else
              if (!strcmp (npbIn, "ERR0010"))
                *(npbIn + TAGLENGTH) = abKey [4];
              else
              if (!strcmp (npbIn, "ERR0011"))
                *(npbIn + TAGLENGTH) = abAltKey [0];
              else
              if (!strcmp (npbIn, "ERR0012"))
                *(npbIn + TAGLENGTH) = abAltKey [1];
              else
              if (!strcmp (npbIn, "ERR0013"))
                *(npbIn + TAGLENGTH) = abAltKey [2];
              else
              if (!strcmp (npbIn, "ERR0014"))
                *(npbIn + TAGLENGTH) = abAltKey [3];
              else
              if (!strcmp (npbIn, "ERR0015"))
                *(npbIn + TAGLENGTH) = abAltKey [4];
              else
              if (!strcmp (npbIn, "HereBoy"))
                *(npbIn + TAGLENGTH) = 'H';
            }  /* endif if this is a string */
        }  /* end for loop searching throught buffer */


      if ( (sNum = write (hfOutFile,
                          abInbuffer + (fFirstWrite ? TAGLENGTH + sizeof (EXEID)+ sizeof(EXEID) : 0),
                          sLength - (fFirstWrite ? TAGLENGTH + sizeof (EXEID) +sizeof (EXEID): 0)) ) == -1)
        {
           sprintf (achFormat, "error writing %s",  pchParams[3]);
          perror( achFormat );
          return;
        }

    memcpy (abInbuffer, abInbuffer + sLength, TAGLENGTH + sizeof (EXEID) + sizeof (EXEID));

    fFirstWrite = FALSE;


    }   /* end while read of file 2 */

  /* Last write to cover what we would have chained if we had received another block */
```

```
    if (sNum = write (hfOutFile,
                    abInbuffer + sLength, TAGLENGTH + sizeof (EXEID)+ sizeof(EXEID)) == -1)
            {
            sprintf (achFormat, "error writing %s",  pchParams[3]);
          perror( achFormat );
          return;
        }


    if (iChanges > 7)
      printf ("Have customized %s\n", pchParams[3]);
    else
      printf ("File %s is not ENCRC2 or UINSTALL\n", pchParams[2]);

    _close (hfKeyFile);
    _close (hfInFile);
    _close (hfOutFile);
    _close (hfCustFile);
    _close (hfExeFile);
}


void Usage ()
{
    printf ("Usage: preinstl KEYFILE FILEIN FILEOUT CUSTFILE EXEFILE\n");
    printf ("        where   KEYFILE contains a 40 bit key\n");
    printf ("                FILEIN is either UINSTALL or ENCRC2\n");
    printf ("                CUSTFILE is a 7 byte customer number\n");
    printf ("                EXEFILE is the exe that will use bitblocker.\n");


}
```

```
/* uinstall.c */

/* Author: Michael B. Cole */
/* Date:  June 29, 1994 */
/* change log*/
/*  WHO        WHEN          WHAT   */
/*  MBC        06/29/94      Initial Version */


#include "encrypt.h"
#include "newexe.h"
#include <stdlib.h>

#define TRUE 1
#define FALSE 0
#define LOWORD(l)           ((unsigned short)(unsigned long)(l))
#define HIWORD(l)           ((unsigned short)((((unsigned long)(l)) >> 16) & 0xFFFF))

HFILE hfInFile;
HFILE hfOutFile;
short sLength;
BYTE  abKey[KEYLENGTH];
BYTE  abCust[TAGLENGTH + sizeof (EXEID) + sizeof (EXEID)] = "SEC0001\0 23456789a123456789b123456789c123456789d
      123456789e123456789f123456";
BYTE  abInbuffer[BUFFER + TAGLENGTH + sizeof (EXEID) + sizeof (EXEID) + sizeof (EXEID)+ sizeof (EXEID) +
      KEYLENGTH];
BYTE  abHold[TAGLENGTH];
NPB   npbIn;
short sNum,i;
BYTE  abKeytoTreasure[KEYLENGTH] = {
                        0x44,
                        0xff,
                        0x98,
                        0x12,
                        0x32,
                        0x77,
                        0x23,
                        0x42
                      };
BYTE  abEncryptedKey[KEYLENGTH];

BYTE  abAltKey[XEYLENGTH] =    {0xaa,
                 0xbb,
                 0xc1,
                 0x12,
                 0x33,
                 0x34,
                 0x45,
                 0x22};

BYTE  abUinstall [sizeof (EXEID) + sizeof (EXEID)];


char  achFileName[255];
char  achTempName[255];

BYTE       abRandom [sizeof (EXEID) + sizeof(EXEID)];
NPB        npbCust;

void Usage (void);

short extract_key (BYTE *);


void main (int iNumber_of_params, char *pchParams[])
{
  int fFirstWrite = TRUE;
  int fChanged = FALSE;
  time_t lTime;
  NPB  npbRandom;
  BYTE  abHold [sizeof (EXEID) + sizeof (EXEID) + sizeof(EXEID) + sizeof (EXEID)];
  NPB   npbHold1, npbHold2, npbPos1, npbPos2;



  if (iNumber_of_params == 1)
    Usage();

  if (iNumber_of_params != 2)
    {
      perror ("wrong number of parameters\nfilein\n");
      return;
    }

    strcpy  (achTempName, pchParams[1]);
    strcat  (achTempName, ".tmp");

    strcpy  (achFileName, pchParams[1]);
    strcat  (achFileName, ".386");

    hfInFile = _open( achFileName, _O_RDONLY | _O_BINARY );

    if (hfInFile == -1)
      {
        strcpy  (achFileName, pchParams[1]);
        strcat  (achFileName, ".exe");

        hfInFile = _open( achFileName, _O_RDONLY | _O_BINARY );

        if (hfInFile == -1)
```

```
          {
            perror( "open failed on input file !" );
            return;
          }
      }


  hfOutFile = _open(  achTempName, _O_RDWR | _O_CREAT | _O_BINARY | _O_TRUNC ,
              _S_IREAD | _S_IWRITE );

  $f( hfOutFile == -1 )
      {
      perror( "open failed on output file" );
      return;
    }

    if (sReturn = extract_key (abKey))
      {
        perror ("Ive been messed with\n");
        return;
      }

  abKey[5] = '\0';
  abKey[6] = '\0';
  abKey[7] = '\0';

    /* prepare to encrypt key */

  abEncryptedKey [0] = abKey [0] ^ abKeytoTreasure [0];
  abEncryptedKey [1] = abKey [1] ^ abKeytoTreasure [1];
  abEncryptedKey [2] = abKey [2] ^ abKeytoTreasure [2];
  abEncryptedKey [3] = abKey [3] ^ abKeytoTreasure [3];
  abEncryptedKey [4] = abKey [4] ^ abKeytoTreasure [4];
  abEncryptedKey [5] = abKey [5] ^ abKeytoTreasure [5];
  abEncryptedKey [6] = abKey [6] ^ abKeytoTreasure [6];
  abEncryptedKey [7] = abKey [7] ^ abKeytoTreasure [7];



  memcpy (abKey, abEncryptedKey, KEYLENGTH);

  /* smoke and mirrors */


  abAltKey[1] ^= abKey[1];
  abAltKey[2] ^= abKey[2];
  abAltKey[3] ^= abKey[3];
  abAltKey[4] ^= abKey[4];
  abAltKey[5] ^= abKey[5];
  abAltKey[6] ^= abKey[6];
  abAltKey[7] ^= abKey[7];
  abAltKey[0] ^= abKey[0];

    /* Seed the random-number generator with current time so that
    * the numbers will be different every time we run.
    */
   lTime = time( NULL );
   srand( LOWORD (lTime) ^ HIWORD (lTime)  );

   for( i = 0; i < sizeof (abRandom); i++ )
             abRandom [i] =  (unsigned char) rand() % 255;




  for (i = 0;
   i < TAGLENGTH + KEYLENGTH + sizeof (EXEID) + sizeof(EXEID) + sizeof (EXEID) + sizeof (EXEID);
     i++)
    abInbuffer[i] = '\0';



  while (sLength = read (hfInFile,
                 abInbuffer + TAGLENGTH + KEYLENGTH + sizeof (EXEID)  + sizeof(EXETD) + sizeof (EXEID) + sizeof
                      (EXEID),
               BUFFER) )
    {
      /* go through every byte in the buffer */

      for (npbIn = abInbuffer;
           npbIn < abInbuffer + sLength - (fFirstWrite ? TAGLENGTH + KEYLENGTH +
                      sizeof (EXEID) + sizeof (EXEID) + sizeof(EXEID) + sizeof(EXEID) : 0);
           npbIn++)
        {
          /* test to see if next TAGLENGTH bytes
             contains a string */



            if ((npbIn[TAGLENGTH - 1] &&
              !fChanged)
              {
              /* check for reinstalling the same customer */

                if (!strcmp (npbIn, abCust))
                  {
                    memcpy (abHold, npbIn + TAGLENGTH + KEYLENGTH, sizeof (abHold));

            /* unhide information */
```

```
        for (npbHold1 = abHold, npbHold2 = abHold + sizeof (EXEID) + sizeof (EXEID);
          npbHold1 < abHold + sizeof(EXEID) + sizeof (EXEID);
          npbHold1++, npbHold2++)
          *npbHold1 ^= *npbHold2;


        /* Is checking it once, is checking it twice */

        for (npbHold1 = abHold, npbHold2 = abHold + sizeof (EXEID);
          npbHold1 < abHold + sizeof(EXEID);
          npbHold1++, npbHold2++)
          *npbHold1 ^= *npbHold2;


            if (!memcmp (abHold, abUinstall, sizeof (EXEID)))
              {
                /* this must be the place */

                        /* hide the exeid info */

            for (npbRandom = abRandom, npbCust =  abCust + TAGLENGTH;
              npbRandom < abRandom + sizeof (abRandom);
               npbCust++, npbRandom++)
              *npbCust ^= *npbRandom;

                  fChanged = TRUE;
                  memcpy (npbIn, abCust, TAGLENGTH);
                  memcpy (npbIn + TAGLENGTH, abKey, KEYLENGTH);
                  memcpy (npbIn + TAGLENGTH + KEYLENGTH, abCust + TAGLENGTH, sizeof (EXEID) + sizeof
                       (EXEID));
                  memcpy (npbIn + TAGLENGTH + KEYLENGTH + sizeof (EXEID) + sizeof (EXEID),
                          abRandom, sizeof(abRandom));
                  /* hide key with randomly generated data */
                  for (npbPos1 = npbIn + TAGLENGTH, npbPos2 = npbIn + TAGLENGTH + KEYLENGTH;
                    npbPos1 < npbIn + TAGLENGTH + KEYLENGTH;
                    npbPos1++, npbPos2++)
                    *npbPos1 ^= *npbPos2;
                  break;
                }
            }


          /* check for empty slot */
          if (!strcmp (npbIn, "future"))
             {

               /* hide the exeid info */

        for (npbRandom = abRandom, npbCust =  abCust + TAGLENGTH;
          npbRandom < abRandom + sizeof (abRandom);
           npbCust++, npbRandom++)
          *npbCust ^= *npbRandom;

               fChanged = TRUE;
               memcpy (npbIn, abCust, TAGLENGTH);
               memcpy (npbIn + TAGLENGTH, abKey, KEYLENGTH);
               memcpy (npbIn + TAGLENGTH + KEYLENGTH, abCust + TAGLENGTH, sizeof (EXEID) + sizeof
                    (EXEID));
               memcpy (npbIn + TAGLENGTH + KEYLENGTH + sizeof (EXEID) + sizeof (EXEID),
                              abRandom, sizeof(abRandom));
            /* hide key with randomly generated data */
            for (npbPos1 = npbIn + TAGLENGTH, npbPos2 = npbIn + TAGLENGTH + KEYLENGTH;
                 npbPos1 < npbIn + TAGLENGTH + KEYLENGTH;
                 npbPos1++, npbPos2++)
                 *npbPos1 ^= *npbPos2;
               break;
             }


          }  /* endif if this is a string */
       }  /* end for loop searching through buffer */


    if ( (sNum = write (hfOutFile,
                    abInbuffer + (fFirstWrite ? TAGLENGTH + KEYLENGTH + sizeof (EXEID)  + sizeof(EXEID)
                        + sizeof (EXEID) + sizeof (EXEID); 0),
                    sLength - ((fFirstWrite ? TAGLENGTH + KEYLENGTH + sizeof (EXEID) + sizeof(EXEID) +
                        sizeof (EXEID) + sizeof (EXEID); 0)) ) == -1)
       {
         perror( "error writing file\n");
         return;
       }

  memcpy (abInbuffer, abInbuffer + sLength, TAGLENGTH + KEYLENGTH + sizeof (EXEID) + sizeof(EXEID) + sizeof
       (EXEID) + sizeof (EXEID));

  fFirstWrite = FALSE;



  }   /* end while read of file 2 */


  /* Last write to cover what we would have chained if we had received another block */

 if (sNum = write (hfOutFile,
                  abInbuffer + sLength,
                   TAGLENGTH + KEYLENGTH + sizeof (EXEID)+ sizeof(EXEID) + sizeof (EXEID) + sizeof (EXEID))
                   == -1)
       {
         perror( "error writing file");
         return;
       }



     if (!fChanged)
       {
         perror ("Failed to install\n");
         exit (1);
       }

    _close (hfInFile);
    _close (hfOutFile);

    if( remove( achFileName ) == -1 )
    {
      perror  ("Error removing file\n");
      return;
    }


     if( rename( achTempName , achFileName) == -1 )
    {
      perror  ("Error renaming file\n");
      return;
    }



}


short extract_key (NPB npbKey)
{
  BYTE bTest;
  BYTE abData [KEYLENGTH] =
  {
    0x0a,
    0x0b,
    0xff,
    0xdd,
    0x87,
    0x55,
    0x76,
    0xcf,
  };

  NPB npbUinstall1, npbUinstall2;


  abData [0] = bPhonyKeyPart1;
  abData [1] = bPhonyKeyPart2;
  abData [2] = bPhonyKeyPart3;
  abData [3] = bPhonyKeyPart4;
  abData [4] = bPhonyKeyPart5;

  memcpy (npbKey, abData, KEYLENGTH);

  memcpy (abUinstall, abCust + TAGLENGTH, sizeof (EXEID) + sizeof(EXEID));

  /* unhide info so that we can compare to what is stored in the VID */
  for (npbUinstall1 = abUinstall, npbUinstall2 = abUinstall + sizeof (EXEID);
      npbUinstall1 < abUinstall + sizeof (EXEID);
      npbUinstall1++, npbUinstall2++)
      *npbUinstall1 ^= *npbUinstall2;



  bTest = bRealKeyPart1 >> 4;

  switch (bTest)
  {
    case 0x01:
      abData [0] = bRealKeyPart1;
      abData [1] = bRealKeyPart2;
      abData [2] = bRealKeyPart3;
      abData [3] = bRealKeyPart4;
      abData [4] = bRealKeyPart5;
      case 0x02:
      abData [4] = bRealKeyPart1;
      abData [3] = bRealKeyPart2;
      abData [2] = bRealKeyPart3;
      abData [1] = bRealKeyPart4;
      abData [0] = bRealKeyPart5;
    default:
      abData [4] = bRealKeyPart1;
      abData [1] = bRealKeyPart2;
      abData [2] = bRealKeyPart3;
      abData [3] = bRealKeyPart4;
      abData [0] = bRealKeyPart5;
  }

  abData [5] = '\0';
  abData [6] = '\0';
  abData [7] = '\0';

  memcpy (npbKey, abData, KEYLENGTH);
  return 0;
}
```

```
void Usage ()
{
  printf ("UINSTALL vxxd\n");
  exit (0);
}
```

I claim:

1. A method of providing copy protection in a computer system comprising the steps of:

program code executing in said computer system intercepting requests for transfer of data from a source region to a destination region;

specifying within said source region a protection region defining protected data;

said program code transferring data from said source region to said destination region, excluding said protection region.

2. The method of claim 1 wherein said step of intercepting requests for transfer of data is performed by means of hooks into an operating environment of said computer system.

3. The method of claim 1 wherein said step of determining a protection region comprises the steps of:

processing a callback function from an application program;

receiving via said callback function an object specifying an individual region to be protected;

forming said protection region from said individual region.

4. The method of claim 1 wherein said step of determining a protection region comprises the steps of:

processing a plurality of callback functions from at least one application program;

receiving via said callback functions a plurality of objects specifying a plurality of individual regions to be protected;

forming said protection region from said individual regions.

5. The method of claim 1 wherein said step of transferring data from said source region to said destination region, excluding said protection region, comprises the steps of:

subtracting said protection region from said destination region to create a first modified destination region;

copying data from said source region into said first modified destination region.

6. The method of claim 1 wherein said step of transferring data from said source region to said destination region, excluding said protection region, comprises the steps of:

subtracting said protection region from said source region to create a modified source region;

copying data from said modified source region into said destination region.

7. The method of claim 1 further comprising the steps of:

replacing said destination region with said protection region to create a second modified destination region;

writing said substitute data into said second modified destination region.

8. The method of claim 1 wherein said data comprises image data and said source region defines a portion of video adapter memory.

9. A method for protecting files within a computer system from misappropriation, said method comprising the steps of:

encrypting files selected for protection;

deciphering said encrypted files only for authorized applications;

prohibiting copying of decrypted file data selected for protection from device memory, said prohibiting process implemented in program code executing in said computer system and comprising the steps of:

intercepting data transfer requests;

determining a protected region of said device memory comprising said decrypted file data selected for protection;

copying into a destination memory only data from those portions of said device memory not within said protected region.

10. The method of claim 9 further comprising the step of filling said protected region within said destination memory with alternate data.

11. The method of claim 9 wherein said step of intercepting data transfer requests is performed by means of hooks into an operating environment of said computer system.

12. The method of claim 9 wherein said step of determining said protected region of said device memory comprises the steps of:

processing through a callback function from an application program;

receiving via said callback function an object specifying an individual region to be protected;

forming said protected region from said individual region.

13. The method of claim 9 wherein said step of determining said protected region of said device memory comprises the steps of:

processing through a plurality of callback functions from at least one application program;

receiving via said callback functions a plurality of objects specifying a plurality of individual regions to be protected;

forming said protected region from said individual regions.

14. A method of file protection for a computer system comprising the steps of:

encrypting selected files using an encryption key;

intercepting a read request from an application program;

determining if a requested file is one of said selected files;

allowing said read request to resume if said requested file is not one of said selected files;

if said requested file is one of said selected files, finding said encryption key in a table by matching a registered application program signature with said application program and selecting a registered encryption key associated with said registered application program signature;

deciphering said requested file using said registered encryption key;

loading said decrypted file into a portion of memory assigned to said application program.

15. The method of claim 14 wherein said step of intercepting a read request is performed via hooks into an operating environment of said computer system.

16. The method of claim 14 wherein said step of deciphering said requested file occurs transparently to said application program.

17. The method of claim 16 wherein said step of deciphering said requested file comprises providing said registered encryption key and said encrypted file to a decryption program running separately from said application program, said decryption program returning said decrypted file.

18. The method of claim 14 wherein said step of determining if said requested file is one of said selected files is performed by searching a portion of said requested file for an encryption signature.

19. The method of claim 14 wherein said table is created within a virtual device driver during installation of a registered application program.

20. A method of providing copy protection of images in a computer system comprising the steps of:

encrypting selected images using an encryption key;

intercepting a request to read an image from an application program;

determining if said requested image is one of said selected images;

allowing said request to resume if said requested image is not one of said selected images;

if said requested image is one of said selected images, finding said encryption key in a table by matching a registered application program signature with said application program and selecting a registered encryption key associated with said registered application program signature;

deciphering said requested image using said registered encryption key;

loading said decrypted image into a portion of memory assigned to said application program;

prohibiting copying of said decrypted image selected for protection from device memory.

21. The method of claim 20 wherein said step of encrypting selected images using an encryption key comprises the steps of:

reading said encryption key and an application;

recording said encryption key and an application signature which is a collection of information about a specific application;

installing said application signature and said encryption key in a decryption table.

22. The method of claim 20 wherein said step of intercepting a read request is performed via hooks into an operation environment of said computer system.

23. The method of claim 20 wherein said step of determining if a requested image is one of said selected images is performed by examining a file's extension.

24. The method of claim 20 wherein said step of prohibiting copying of said decrypted image selected for protection from device memory comprises the steps of:

intercepting transfer requests for said decrypted file data recognizable for display on a display means;

determining a protected region of said device memory comprising said decrypted image data selected for protection;

copying into a destination memory only data from those portions of said device memory not within said protected region.

25. The method of claim 24 wherein said step of intercepting transfer requests for said decrypted file data is performed by means of hooks into an operating environment of said computer system.

26. An article of manufacture comprising:

a computer usable medium having computer readable program code embodied therein for providing copy protection, the computer readable program code in said article of manufacture comprising:

computer readable program code configured to cause a computer to intercept requests for transfer of data from a source region to a destination region;

computer readable program code configured to cause said computer to specify within said source region a protection region defining protected data; and computer readable program code configured to cause said computer to transfer data from said source region to said destination region, excluding said protection region.

27. The article of manufacture of claim 26 wherein said program code configured to cause a computer to intercept requests for transfer of data comprises computer readable program code configured to cause said computer to hook into an operating environment of said computer system.

28. The article of manufacture of claim 26 wherein said program code configured to cause said computer to specify a protection region further comprises:

computer readable program code configured to cause said computer to process a callback function from an application program;

computer readable program code configured to cause said computer to receive via said callback function an object specifying an individual region to be protected; and computer readable program code configured to cause said computer to form said protection region from said individual region.

29. The article of manufacture of claim 26 wherein said program code configured to cause said computer to specify a protection region further comprises:

computer readable program code configured to cause said computer to process a plurality of callback functions from at least one application program;

computer readable program code configured to cause said computer to receive via said callback functions a plurality of objects specifying a plurality of individual regions to be protected; and computer readable program code configured to cause said computer to form said protection region from said individual region.

30. The article of manufacture of claim 26 wherein said program code configured to cause said computer to transfer data from said source region to said destination region, excluding said protection region further comprises:

computer readable program code configured to cause said computer to subtract said protection region from said destination region to create a first modified destination region; and computer readable program code configured to cause said computer to copy data from said source region into said first modified destination region.

31. The article of manufacture of claim 26 wherein said program code configured to cause said computer to transfer data from said source region to said destination region, excluding said protection region further comprises:

computer readable program code configured to cause said computer to subtract said protection region from said source region to create a modified source region; and computer readable program code configured to cause said computer to copy data from said modified source region into said destination region.

32. The article of manufacture of claim 26 further comprising:

computer readable program code configured to cause said computer to replace said destination region with said protection region to create a second modified destination region; and computer readable program code configured to cause said computer to write said substitute data into said second modified destination region.

33. The article of manufacture of claim 26 wherein said data comprises image data and said source region defines a portion of video adapter memory.

34. An article of manufacture comprising:

a computer usable medium having computer readable program code embodied therein for protecting files within a computer system from misappropriation, the computer readable program code in said article of manufacture comprising:

computer readable program code configured to cause a computer to encrypt files selected for protection;

computer readable program code configured to cause said computer to decipher said encrypted files only for authorized applications;

computer readable program code configured to cause said computer to prohibit copying of decrypted file data selected for protection from device memory, said prohibiting program code further comprising:

computer readable program code configured to cause said computer to intercept data transfer requests;

computer readable program code configured to cause said computer to determine a protected region of said device memory comprising said decrypted file data selected for protection;

computer readable program code configured to cause said computer to copy into a destination memory only data from those portions of said device memory not within said protected region.

35. The article of manufacture of claim 34 further comprising computer readable program code configured to cause said computer to fill said protected region within said destination memory with alternate data.

36. The article of manufacture of claim 34 wherein said program code configured to cause said computer to intercept data transfer requests comprises computer readable program code configured to cause said computer to hook into an operating environment of said computer system.

37. The article of manufacture of claim 34 wherein said program code configured to cause said computer to determine said protected region of said device memory comprises:

computer readable program code configured to cause said computer to process through a callback function from an application program;

computer readable program code configured to cause said computer to receive via said callback function an object specifying an individual region to be protected;

computer readable program code configured to cause said computer to form said protected region from said individual region.

38. The article of manufacture of claim 34 wherein said program code configured to cause said computer to determine said protected region of said device memory comprises:

computer readable program code configured to cause said computer to process through a plurality of callback functions from at least one application program;

computer readable program code configured to cause said computer to receive via said callback functions a plurality of objects specifying a plurality of individual regions to be protected; and computer readable program code configured to cause said computer to form said protected region from said individual regions.

39. An article of manufacture comprising:

a computer usable medium having computer readable program code embodied therein for file protection for a computer system, the computer readable program code in said article of manufacture comprising:

computer readable program code configured to cause a computer to encrypt selected files using an encryption key;

computer readable program code configured to cause said computer to intercept a read request from an application program;

computer readable program code configured to cause said computer to determine if a requested file is one of said selected files;

if said requested file is not one of said selected files, computer readable program code configured to cause said computer to allow said read request to resume;

if said requested file is one of said selected files, computer readable program code configured to cause said computer to find said encryption key in a table by matching a registered application program signature with said application program and selecting a registered encryption key associated with said registered application program signature;

computer readable program code configured to cause said computer to decipher said requested file using said registered encryption key;

computer readable program code configured to cause said computer to load said decrypted file into a portion of memory assigned to said application program.

40. The article of manufacture of claim 39 wherein said program code configured to cause said computer to intercept a read request comprises computer readable program code configured to cause said computer to hook into an operating environment of said computer system.

41. The article of manufacture of claim 39 wherein said program code configured to cause said computer to decipher said requested file occurs transparently to said application program.

42. The article of manufacture of claim 41 wherein said program code configured to cause said computer to decipher said requested file comprises computer readable program code configured to cause said computer to provide said registered encryption key and said encrypted file to a decryption program running separately from said application program, said decryption program returning said decrypted file.

43. The article of manufacture of claim 39 wherein said program code configured to cause said computer to determine if said requested file is one of said selected files comprises computer readable program code configured to cause said computer to search a portion of said requested file for an encryption signature.

44. The article of manufacture of claim 39 wherein said table is created within a virtual device driver during installation of a registered application program.

45. An article of manufacture comprising:

a computer usable medium having computer readable program code embodied therein for providing copy protection of images in a computer system, the computer readable program code in said article of manufacture comprising:

computer readable program code configured to cause a computer to encrypt selected images using an encryption key;

computer readable program code configured to cause said computer to intercept a request to read an image from an application program;

computer readable program code configured to cause said computer to determine if said requested image is one of said selected images;

computer readable program code configured to cause said computer to allow said request to resume if said requested image is not one of said selected images;

if said requested image is one of said selected images, computer readable program code configured to cause said computer to finding said encryption key in a table by matching a registered application program signature with said application program and selecting a registered encryption key associated with said registered application program signature;

computer readable program code configured to cause said computer to decipher said requested image using said registered encryption key;

computer readable program code configured to cause said computer to load said decrypted image into a portion of memory assigned to said application program;

computer readable program code configured to cause said computer to prohibit copying of said decrypted image selected for protection from device memory.

46. The article of manufacture of claim 45 wherein said program code configured to cause a computer to encrypt selected images using an encryption key further comprises:

computer readable program code configured to cause said computer to read said encryption key and an application;

computer readable program code configured to cause said computer to record said encryption key and an application signature which is a collection of information about a specific application;

computer readable program code configured to cause said computer to install said application signature and said encryption key in a decryption table.

47. The article of manufacture of claim 45 wherein said computer readable program code configured to cause said computer to intercept a read request comprises computer readable program code configured to cause said computer to hook into an operation environment of said computer system.

48. The article of manufacture of claim 45 wherein said computer readable program code configured to cause said computer to determine if a requested image is one of said selected images comprises computer readable program code configured to cause said computer to examine a file's extension.

49. The article of manufacture of claim 45 wherein said program code configured to cause said computer to prohibit copying of said decrypted image selected for protection from device memory comprises:

computer readable program code configured to cause said computer to intercept transfer requests for said decrypted file data recognizable for display on a display means;

computer readable program code configured to cause said computer to determine a protected region of said device memory comprising said decrypted image data selected for protection;

computer readable program code configured to cause said computer to copy into a destination memory only data from those portions of said device memory not within said protected region.

50. The article of manufacture of claim 49 wherein said program code configured to cause said computer to intercept transfer requests for said decrypted file data comprises computer readable program code configured to cause said computer to hook into an operating environment of said computer system.

51. An article of manufacture comprising:

a computer usable medium having computer readable program code embodied therein for providing copy protection in a computer system, the computer readable program code in said article of manufacture comprising:

computer readable program code configured to cause a computer to intercept requests for transfer of data that is displayed on a display means from a source region to a destination region;

computer readable program code configured to cause said computer to specify within said source region a protection region defining protected data; and computer readable program code configured to cause said computer to transfer data from said source region to said destination region, excluding said protection region.

52. The article of manufacture of claim 51 wherein said program code configured to cause a computer to intercept requests for transfer of data comprises computer readable program code configured to cause said computer to hook into an operating environment of said computer system.

53. The article of manufacture of claim 51 wherein said program code configured to cause said computer to specify a protection region comprises:

computer readable program code configured to cause said computer to process a callback function from an application program;

computer readable program code configured to cause said computer to receive via said callback function an object specifying an individual region to be protected; and computer readable program code configured to cause said computer to form said protection region from said individual region.

54. The article of manufacture of claim 51 wherein said program code configured to cause said computer to specify a protection region comprises the steps of:

computer readable program code configured to cause said computer to process a plurality of callback functions from at least one application program;

computer readable program code configured to cause said computer to receive via said callback functions a plurality of objects specifying a plurality of individual regions to be protected; and computer readable program code configured to cause said computer to form said protection region from said individual regions.

55. The article of manufacture of claim 51 wherein said program code configured to cause said computer to transfer data from said source region to said destination region, excluding said protection region, comprises:

computer readable program code configured to cause said computer to subtract said protection region from said destination region to create a first modified destination region; and computer readable program code configured to cause said computer to copy data from said source region into said first modified destination region.

56. The article of manufacture of claim 51 wherein said program code configured to cause said computer to transfer data from said source region to said destination region, excluding said protection region, comprises:

computer readable program code configured to cause said computer to subtract said protection region from said source region to create a modified source region; and computer readable program code configured to cause said computer to copy data from said modified source region into said destination region.

57. The article of manufacture of claim 51 further comprising:

computer readable program code configured to cause said computer to replace said destination region with said protection region to create a second modified destination region; and computer readable program code configured to cause said computer to write said substitute data into said second modified destination region.

58. The article of manufacture of claim 51 wherein said data comprises image data and said source region defines a portion of video adapter memory.

* * * * *